United States Patent
Laselva et al.

(10) Patent No.: US 12,501,515 B2
(45) Date of Patent: Dec. 16, 2025

(54) INDICATION FOR SMALL DATA TRANSMISSION

(71) Applicant: Nokia Technologies Oy, Espoo (FI)

(72) Inventors: Daniela Laselva, Klarup (DK); Nuno Manuel Kiilerich Pratas, Gistrup (DK)

(73) Assignee: Nokia Technologies Oy, Espoo (FI)

( * ) Notice: Subject to any disclaimer, the term of this patent is extended or adjusted under 35 U.S.C. 154(b) by 341 days.

(21) Appl. No.: 18/245,037

(22) PCT Filed: Aug. 23, 2021

(86) PCT No.: PCT/EP2021/073256
§ 371 (c)(1),
(2) Date: Mar. 13, 2023

(87) PCT Pub. No.: WO2022/083921
PCT Pub. Date: Apr. 28, 2022

(65) Prior Publication Data
US 2023/0363054 A1 Nov. 9, 2023

(30) Foreign Application Priority Data

Oct. 21, 2020 (EP) .................................... 20203042

(51) Int. Cl.
*H04W 76/30* (2018.01)
*H04W 72/23* (2023.01)
*H04W 74/0833* (2024.01)
*H04W 74/0836* (2024.01)
*H04W 74/0838* (2024.01)

(52) U.S. Cl.
CPC ........... *H04W 76/30* (2018.02); *H04W 72/23* (2023.01); *H04W 74/0833* (2013.01); *H04W 74/0836* (2024.01); *H04W 74/0838* (2024.01)

(58) Field of Classification Search
CPC .............................. H04W 76/30; H04W 72/23
See application file for complete search history.

(56) References Cited

U.S. PATENT DOCUMENTS 9,860,924 B2   1/2018   Ianev et al.
11,678,378 B2 * 6/2023   Lin ...................... H04L 1/1812
                                                     370/329

(Continued)

FOREIGN PATENT DOCUMENTS

CN    109699088 A    4/2019
CN    110278612 A    9/2019

(Continued)

OTHER PUBLICATIONS

Office Action from Patent App. No. 310/2021/333 from the People's Republic of Bangladesh dated Oct. 23, 2024.

(Continued)

*Primary Examiner* — Chandrahas B Patel
(74) *Attorney, Agent, or Firm* — Lippes Mathias LLP

(57) ABSTRACT

The invention inter alia relates to a user equipment comprising means configured to transmit, to the network, first data in a small data transmission procedure in a non-connected state; and during said small data transmission procedure in the non-connected state, transmit, to the network, an indication for transmission of second data, the second data becoming available for transmission after said first data having been transmitted.

17 Claims, 17 Drawing Sheets

(56) References Cited

U.S. PATENT DOCUMENTS

| | | | |
|---|---|---|---|
| 11,997,739 B2* | 5/2024 | Wu | H04W 56/0055 |
| 2016/0302227 A9 | 10/2016 | Wager et al. | |
| 2019/0124715 A1 | 4/2019 | Chen et al. | |
| 2020/0037345 A1 | 1/2020 | Ryoo et al. | |
| 2020/0053791 A1 | 2/2020 | Ozturk et al. | |
| 2020/0092905 A1 | 3/2020 | Vos et al. | |
| 2023/0088082 A1* | 3/2023 | Lin | H04W 76/19 |
| | | | 370/329 |

FOREIGN PATENT DOCUMENTS

| | | |
|---|---|---|
| EP | 3506708 A1 | 7/2019 |
| TW | 201902243 A | 1/2019 |
| WO | 2017/048170 A1 | 3/2017 |
| WO | 2018214052 A1 | 11/2018 |
| WO | 2019/022530 A1 | 1/2019 |
| WO | 2019061098 A1 | 4/2019 |
| WO | 2019/217829 A1 | 11/2019 |
| WO | 2020/034560 A1 | 2/2020 |
| WO | 2020148483 A1 | 7/2020 |

OTHER PUBLICATIONS

European Office Action relating to EP App. No. 20203042.5 dated Jan. 30, 2025.
3GPP TSG-RAN WG2 Meeting #111, R2-2006830, "Subsequent Transmission of Small Data in Inactive", dated Aug. 17-28, 2020.
Office Action received for corresponding European Patent Application No. 20203042.5, dated Jan. 25, 2024, 8 pages of Office Action.
Office Action, Japanese Pat. App. No. 2023-524473, dated Jun. 28, 2024.
Summary of Office Action, Japanese Pat. App. No. 2023-524473, dated Jun. 28, 2024.
SDT Mechanism on RRC/Non-RCC Based Approaches and RACH Requirements, 3GPP TSG RAN WG2 Meeting #111-e, R2-2006713, Intel Corporation, Aug. 17-28, 2020.
Subsequent Transmission of Small Data in Inactive, 3GPP TSG-RAN WG2 Meeting #111 electronic, R2-2006830, MediaTek, Inc., Aug. 1720,2020.
RACH based NR Small Data Transmission, 3GPP TSG-RAN WG2 Meeting, #111e, R2-2007540, Qualcomm Incorporated, Aug. 17-28, 2020.
Way Forward for UL Data Transmission in Inactive, 3GPP TSG-RAN WG2 Meeting #97bis, R2-1703360, Samsung, Apr. 3-7, 2017.
"Work Item on NR smalldata transmissions in Inactive state", 3GPP TSG RAN Meeting #86, RP-193252, Agenda: 9.1.2, ZTE Corporation, Dec. 9-12, 2019, 4 pages.
"SDT mechanism on RRC/non-RCC based approaches and RACH requirements", 3GPP TSG RAN WG2 Meeting #111-e, R2-2006713, Agenda: 8.6.2, Intel Corporation, Aug. 17-28, 2020, 10 pages.
"Radio bearer configuration for SDT considering UE context relocation and CU/DU split", 3GPP TSG RAN WG2 Meeting #111-e, R2-2006714, Agenda: 8.6.2, Intel Corporation, Aug. 17-28, 2020, 6 pages.
"3rd Generation Partnership Project; Technical Specification Group Radio Access Network; NR; User Equipment (UE) radio access capabilities (Release 16)", 3GPP TS 38.306, V16.1.0, Jul. 2020, pp. 1-106.
"3rd Generation Partnership Project; Technical Specification Group Radio Access Network; NR; Radio Resource Control (RRC) protocol specification (Release 16)", 3GPP TS 38.331, V16.1.0, Jul. 2020, pp. 1-906.
"3rd Generation Partnership Project; Technical Specification Group Radio Access Network; NR; Medium Access Control (MAC) protocol specification (Release 16)", 3GPP TS 38.321, V16.1.0, Jul. 2020, pp. 1-151.
"3rd Generation Partnership Project; Technical Specification Group Radio Access Network; NR; Physical channels and modulation (Release 16)", 3GPP TS 38.211, V16.2.0, Jun. 2020, pp. 1-131.
"3rd Generation Partnership Project; Technical Specification Group Radio Access Network; NR; NR and NG-RAN Overall Description; Stage 2 (Release 16)", 3GPP TS 38.300, V16.2.0, Jul. 2020, pp. 1-148.
"RACH based NR small data transmission", 3GPP TSG-RAN WG2 Meeting #111e, R2-2007540, Agenda: 8.6.2, Qualcomm Incorporated, Aug. 17-28, 2020, pp. 1-5.
"Discussion on UL small data transmissions for RACH-based schemes", 3GPP TSG-RAN WG2 Meeting #111e, R2-2007047, Agenda: 8.6.2, Spreadtrum Communications, Aug. 17-28, 2020, 2 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300, V16.2.0, Jul. 2020, pp. 1-390.
"RACH-based UL small data transmission procedure", 3GPP RAN WG2 Meeting #111e, R2-2007613, Agenda: 8.6.2, InterDigital, Aug. 17-28, 2020, pp. 1-3.
Andres-Maldonado et al., "Optimized LTE Data Transmission Procedures for IoT: Device Side Energy Consumption Analysis", arXiv, Jul. 17, 2017, 6 pages.
Extended European Search Report received for corresponding European Patent Application No. 20203042.5, dated Apr. 12, 2021, 10 pages.
International Search Report and Written Opinion received for corresponding Patent Cooperation Treaty Application No. PCT/EP2021/073256, dated Nov. 15, 2021, 12 pages.
Examiner's Preliminary Examination Opinion received for corresponding Taiwan Patent Application No. 110138608, dated Apr. 8, 2022, 4 pages of Examiner's Preliminary Examination Opinion and 3 pages of translation available.
Office Action received for corresponding Taiwan Patent Application No. 110136608, dated Jul. 25, 2022, 4 pages of Office Action and 2 pages of translation available.
Office action received for corresponding Indian Patent Application No. 202347033147, dated Mar. 18, 2024, 8 pages.
Office Action with machine translation and search report received for corresponding Chinese Patent App. No. 202180070682.1 dated May 14, 2025, 19 pages.
UL Small Data Transmission in Inactive State, 3GPP TSG-RAN WG2 Meeting #96, CATT, Nov. 18, 2016, 6 pages.
SDT Mechanism on RRC/non-RRC Based Approaches and RACH Requirements, 3GPP TSG, RAN WG2 Meeting #111-e, Intel Corporation, Aug. 17-28, 2020, 10 pages.
Subsequent Transmission of Small Data in Inactive, 3GPP TSG-RAN WG2 Meeting #111 electronic, MediaTek Inc., Aug. 17-28, 2020, 5 pages.
RACH Based NR Small Data Transmission, 3GPP TSG-RAN WG2 Meeting #111e, Qualcomm Incorporated, Aug. 17-28, 2020, 5 pages.
Argentinian Office Action relating to Application No. 20210102872 dated Jan. 28, 2025.

* cited by examiner

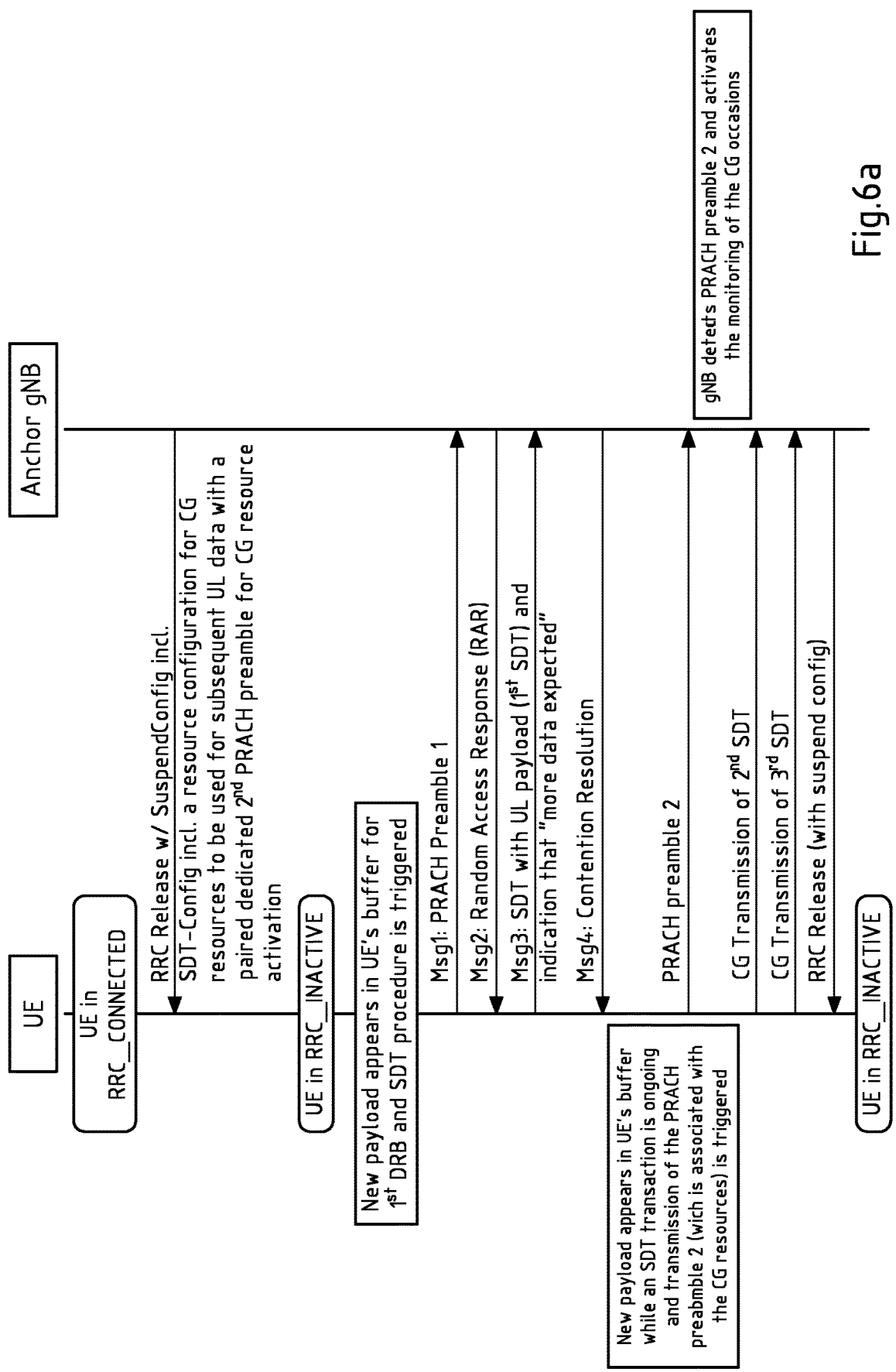

INDICATION FOR SMALL DATA TRANSMISSION

RELATED APPLICATION

This application was originally filed as PCT Application No. PCT/EP2021/073256, filed on Aug. 23, 2021, which claims priority from EP Application Serial No. 20203042.5, filed on Oct. 21, 2020, each of which is incorporated herein by reference in its entirety.

TECHNOLOGICAL FIELD

The present disclosure pertains to but is not limited to communication networks, such as those defined by the 3GPP standard, and specifically the 5G standard, also referred to as New Radio, NR. More specifically the present disclosure pertains to mechanisms for the transmission of small data (so called small data transmission, SDT) in an inactive state, such as the RRC inactive state.

BACKGROUND

Basically, three approaches can be identified for enabling a small data transmission (SDT) of uplink user plane data in a radio resource control (RRC) Inactive state of a 5G NR system.

One approach could be a 4-step random access channel (RACH) based SDT. In this approach user plane (UP) data is transmitted in Message 3 (Msg3) of a 4-step RACH procedure. Specifically, a small payload is multiplexed with e.g. an RRC Connection Resume Request. This approach is illustrated in FIG. 2a).

A further approach could be a 2-step RACH based SDT. In this approach, a UP data transmission happens with Message A (MsgA) of a 2-step RACH procedure and more specifically on the physical uplink shared channel (PUSCH) resources that are pre-configured by the base station (gNB) and broadcast as System Information with associated physical transmission parameters. Such an approach is illustrated in FIG. 2b).

A further approach could be a Configured Grant based SDT. In this a UE in the RRC Connected state can receive a CG configuration, e.g. CG configuration type 1, that indicates the specific pre-configured PUSCH resources to be used for the UL data transmission in the RRC Inactive state as long as the associated validity conditions are met, e.g. the timing alignment is valid. Such an approach is illustrated in FIG. 2c).

These approaches of FIG. 2 assume an RRC-based approach. It entails that the user equipment (UE) sends an RRC message including information about the UE identity and its authentication token (i.e. MAC-I). In the approach illustrated in FIG. 2, the RRC Resume Request message is used for this purpose. FIG. 3 shows a corresponding UL MAC PDU, i.e. the exemplary content of the UL MAC PDU for SDT Msg3/MsgA or CG-based SDT transmission for the RRC-based method. To the contrary, an RRC-less approach would assume that the RRC layer need not be involved in SDT operations and the necessary information, such as UE identity and/or UE authentication token, would be provided by the UE e.g. in the MAC header or as a MAC control element (MAC CE). Generally both methods could be used. While the RRC-based method is assumed as baseline, the non-RRC method is considered for more limited use cases (e.g. same serving cell and/or for CG). In order to decide whether to do SDT at all or rather a legacy resume procedure, a data volume threshold may be used for the UE.

It is desired that multiple small data transmissions are possible within a single SDT procedure (i.e. multi-shot SDT), entailing that multiple UL and/or DL transmissions of small data (SDT transmissions) are sent following a first UL SDT without transitioning the UE to the RRC connected state. However, there is the problem, that the additional data may become available in the UE buffer only after the UE has already sent the first SDT transmission. In that case, the UE has no means to indicate the presence of additional data to the network and instead needs to initiate a new SDT procedure after the ongoing SDT procedure is ended. This is inefficient as it leads to e.g. PRACH preamble resources inefficiency and may increase the PRACH collision probability. Furthermore, when the SDT is made in a new serving gNB (different than the last serving gNB), the UE context retrieval procedure has to be triggered after the reception of the first SDT transmission by the network (i.e. after the reception of e.g. Msg3/MsgA), and therefore a large delay can be encountered before the UE receives the network response that concludes the SDT transaction (MsgB/Msg4). The likelihood of new data becoming available at the UE buffer depends on and increases with such delay, which is function of the Xn latency (2-way Xn latency plus network processing delay) and could be up to 20-30 ms. This scenario is illustrated in FIG. 4.

Additionally, the network may not necessarily send the RRC release message in the same MAC payload with the contention resolution, e.g. due to waiting to see whether DL data arrives (including application level feedback to the UL SDT), or waiting for the UE context to be fetched.

Furthermore, while the UE may receive an additional resource configuration for transmitting further small data (i.e. the network may configure a dedicated preconfigured PUSCH resource, such as a Configured Grant) together with the RRC release message (MsgB/Msg4), this only allows the allocation of resources after the UE has received the RRC Release message already terminating the ongoing small data transmission. So the UE would need to repeat a complete SDT procedure leading to potentially inefficient signaling.

SUMMARY OF SOME EXEMPLARY EMBODIMENTS

Certain embodiments may have the effect that a user equipment is enabled to transmit an indication for new data during an ongoing small data transmission procedure and to potentially also transmit the respective new data during the same ongoing small data transmission procedure in order to avoid resource inefficiency, extra packet delay, and additional power consumption.

According to a first exemplary aspect, a user equipment is disclosed comprising means which may be configured to transmit, to the network, first data in a small data transmission procedure in the non-connected state. The user equipment may further be configured to, during said small data transmission procedure in the non-connected state, transmit, to the network, an indication for transmission of second data. The second data may only become available for transmission after said first data having been transmitted.

According to the first exemplary aspect, a method, at least performed by a user equipment, is also disclosed. The method may comprise transmitting, to the network, first data in a small data transmission procedure in the non-connected state. The method may also comprise, during the small data transmission procedure, transmitting, to the network, an indication for transmission of second data. The second data may only become available for transmission after said first data having been transmitted.

According to a second exemplary aspect, a network entity is disclosed, comprising means which may be configured to receive, from a user equipment in a non-connected state, first data in a small data transmission procedure. The network entity may further be configured to transmit, to the user equipment, a resource configuration pertaining to a transmission of an indication of second data and/or to a transmission of the second data to occur during the small data transmission procedure. The network entity may further be configured to, during the small data transmission procedure, receive, from the user equipment in the non-connected state, the indication for transmission of second data.

According to the second exemplary aspect a method, at least performed by at a network entity, is also disclosed. The method may comprise receiving, from a user equipment in a non-connected state, first data in a small data transmission procedure. The method may comprise transmitting, to the user equipment, a resource configuration pertaining to a transmission of an indication of second data and/or to a transmission of the second data to occur during the small data transmission procedure. The method may further comprise, during the small data transmission procedure, receiving, from the user equipment in the non-connected state, the indication for transmission of second data.

The user equipment (UE) of the first exemplary aspect may be an electronic device, such as a mobile device or mobile station. The user equipment may in particular be a device, such as a smart phone, a tablet, a wearable, a smartwatch or the like. The user equipment may also be an IoT device (e.g. a sensor device, a smart home device or the like) and may in particular be a low power or battery powered device. Such devices typically need to regularly send small amounts of data, so that the approach described herein is particularly advantageous. A user equipment may be understood as any device used directly by an end-user in order to communicate with a network. However, the device may also function and communicate with the network autonomously. The mobile device of the second exemplary aspect may be in direct or indirect communication with the network entity of the first exemplary aspect.

The network entity of the second exemplary aspect may be an electronic device, such as an entity of a radio access network or the core network of a communication system. For instance, the network entity may be or comprise a base station (e.g. a gNodeB or gNB) or be in communication with a base station. In this regard and as will be explained in more detail below, the network entity may be the last serving (or anchor) base station or a new serving base station. Generally, the network entity may be a hardware or software component implementing a certain functionality. In an example, the network entity may be a network entity as defined by the 3GPP 5G standard. While the network entity may be understood to be implemented in or be a single device or module, the network entity may also be implemented across or comprise multiple devices or modules. As such, the network entity may in particular be implemented in or be a stationary device. Multiple network entities of the first exemplary aspect may in particular establish a communication system or network, which may in particular be a New Radio (NR) or 5G system or any other mobile communications system defined by a past or future standards, in particular successors of the present 3GPP standards. The network entity of the first exemplary aspect may be in direct or indirect communication with the mobile device of the second exemplary aspect.

The means of any of the disclosed apparatuses (user equipment and network entity) can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

Thus, according to a respective exemplary aspect of the present disclosure, there is also disclosed a respective apparatus (i.e. a network entity and a user equipment device) comprising at least one processor and at least one memory including computer program code, the at least one memory and the computer program code configured to, with the at least one processor, cause an apparatus at least to perform and/or to control the method according to a respective exemplary aspect of the present disclosure.

Any of the above-disclosed apparatuses may be a module or a component for a device, for example a chip. The disclosed apparatus may comprise the disclosed components, for instance means, processor, memory, or may further comprise one or more additional components.

The method of a respective aspect may for instance be performed and/or controlled by the apparatus according to the respective aspect, i.e. the network entity or the mobile device, respectively. Generally, however, a respective method may also be performed and/or controlled by more than one apparatus. For instance the method according to the second exemplary aspect may be performed by multiple network entities.

Furthermore, a combination of the first method and the second method shall also be considered disclosed, which is then performed by the user equipment and one or more network entities together. Likewise a system of the user equipment of the first exemplary aspect and the network entity of the second exemplary aspect working together to perform aspects of the disclosure is also disclosed.

According to the first and second exemplary aspects of the present disclosure, there is in each case also disclosed a computer program, the computer program when executed by a processor of an apparatus causing said apparatus to perform a method according to the first and second aspect respectively.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

In the following, further exemplary features and exemplary embodiments of the different aspects of the present disclosure will be described in more detail.

A non-connected state may be a state which does not have or provide the full communication functionality, but which still maintains a certain restricted functionality. In an example, the non-connected state may be the idle state (e.g. RRC idle). For instance, the non-connected state may be an inactive state (e.g. RRC inactive). Therein, the user equipment does not need to completely release the respective radio connection (typically referred to as idle state), but does also not need to completely maintain the respective connection (typically referred to as connected state). From the non-connected and in particular the inactive state the user equipment may quickly return to a connected state. However, in the presently described approach, it is preferred that the user equipment does not leave the non-connected state for data transfer. Rather, the user equipment may stay the whole time in the non-connected state without completely returning to the connected state and nevertheless be able sent certain amounts of data to the network. This is unless instructed by the network to return to the connected state, e.g. because the data to be transmitted is too large, as will be explained in more detail below.

Specifically the inactive state (compared to the connected or idle state) may be characterized by one or more of the following characteristics. For instance, the context information may be maintained by the UE and the network when the UE moves from the connected state to the inactive state. For instance, the RAN/CN connection may be kept, which may reduce state transition latency and signaling overhead over the RAN/CN interface. For instance, the UE Access Stratum context, e.g. AS security context and DRB/SRB configurations, may be stored in the UE and in the RAN. This may allow reducing state transition latency and signaling overhead over the air interface at resume. For instance, the UE mobility may be based on autonomous cell reselection, where the UE may move within its tracking area or alike (e.g. RAN notification area) without updating its location towards the network. This may allow lower UE power and network resource consumption, compared to network controlled mobility. For instance, paging may be used to reach the UE. For instance, the UE behavior in the inactive state may be configured based on the requirements of an application running in the UE.

For instance, the user equipment may obtain information (such as suspendConfig) with a (first) connection release message, which instructs or allows the UE to enter the non-connected state (instead of the idle or disconnected state) and provides the required configuration for the non-connected state. The configuration can then be applied resulting in the UE entering the non-connected state.

The first data (which may in particular be referred to first small data), is transmitted in a small data transmission procedure by the UE using a small data transmission. The network entity receives the first data. The data of the small data transmission may also be referred to as small data. The first data may be transmitted preferably in a single message. For instance, the data is sent together or multiplexed with another information/message, such as a resume request. The small data transmission procedure may be considered started with the user equipment initiating a random access procedure in the case of RACH based SDT. For instance, the small data transmission procedure may begin with Msg1 or MsgA of a four-step and two-step RACH procedure, respectively. For instance, the small data transmission procedure may begin with the UE transmitting a RACH preamble to the network. For instance, the small data transmission procedure may begin with a CG-based PUSCH transmission. The small data transmission procedure may end with the network sending a (second) message, for instance a release message instructing the UE to e.g. return to the non-connected state. However, the second message may also instruct the UE to return to the connected state, for instance. In the approach describe herein, the user equipment will remain in the non-connected state during the data transmission of the first data and during the whole small data transmission procedure, and preferably it will be able to send second data during the small data procedure, and will preferably also return to the non-connected state.

The UE transmits an indication for transmission of a second data (in the following also referred to as additional or further data) to the network. The network receives the indication for the transmission of second data. For instance, the indication may be considered as an indication of the UE for the presence or expectance of additional data, which needs to be transmitted. The indication may indicate that there is already second data (i.e. data additional to the already sent first data) available at the UE, for instance in a buffer of the UE. Alternatively, the indication may also indicate that second data is expected, but for instance not yet available in the buffer of the UE. For instance, with the indication, the UE may indicate that it desires to transmit the second data also in the non-connected state and/or during the ongoing small data transmission procedure. In an example, the indication may be considered to be an indication for requesting (from the network) resources for the transmission of second data. In an example, the indication may only indicate that second data is available or shall be transmitted, which may in its simplest form being realized by providing a one bit information field. However, the indication may also comprise further information. For instance, the indication may also indicate the (known or expected) size of the second data. As will be explained further below, the described indication may be realized by a scheduling request or buffer status report.

That the indication is transmitted during the small data transmission procedure is understood to mean that the indication is transmitted before completion of the small data transmission procedure. As explained above, this is in particular understood to mean that the indication is transmitted before the UE receives the (second) message considered to conclude the small data transmission procedure. As explained above, the UE can still remain in the non-connected state for transmitting the indication.

The indication may also be an indication for transmission of even further data, e.g. third, fourth, etc. data. For instance, the UE may also repeat the transmission of an indication during said small data transmission procedure in the non-connected state (e.g. because data to be sent arrives repeatedly in the buffer of the UE) resulting multiple indications during a single small data transmission procedure.

When the indication is received at the network, this will allow the network to provide resources and/or monitor already provided resources (as will be described in more detail below) for the transmission of the second data still during the same small data transmission procedure.

Thus, the described approach provides means for the UE to indicate the presence of new data during an ongoing small data transmission procedure and thus also enable the UE to send the respective new data during the same ongoing small data transmission in order to avoid resource inefficiency and extra packet delay. The disclosure realized that it is advantageous to allow an indication, such as a scheduling request, in the non-connected state during the ongoing small data transmission procedure, even though for instance a scheduling request was originally only defined in the RRC connected state and was neither supposed to be applicable for a UE in an RRC non-connected state nor in the idle state.

As already explained above, while a (PUSCH) resource configuration could be contained for instance in the release message transmitted in MsgB or Msg4. This would however lead to the allocation of resources only after the UE has indicated the presence of further data in the first SDT transmission carrying the first data and received the RRC Release message and thus terminated the small data transmission. In contrast, the present approach allows to consider new data generated or made available in the time interval after the first SDT transmission carrying the first data, i.e. between the initial transmission of the SDT payload (e.g. Msg3 in the 4-step RACH procedure or MsgA in 2-step RACH procedure) and the reception of a second message from the network that would end the SDT procedure, where additional SDT data can be generated at the UE depending on the duration of the small data transmission procedure.

While the described approach may be applicable to different layers, connections and protocols, in an example, the protocol used for the described communication between the UE and the network is the RRC protocol. Accordingly, the non-connected state is an RRC non-connected state.

The (first, second, etc.) data transmitted in the small data transmission procedure, may accordingly be considered small data. For instance, the (first, second, etc.) data of such a small data transmission may in particular be considered small, when they are in the order of up to kilobytes. For instance, data may be considered small for data of up to a few kilobytes, such as up to 10 kilobytes, 8 kilobytes, 1 kilobyte or 0.5 kilobytes, or 50 kilobytes. However, larger amounts of data may be possible, if they are sent in multiple SDTs with one SDT procedure, while the number of transmissions within a single SDT procedure may then in turn again be limited.

The first and/or second data may in particular be user plane data. For instance, the data may originate from the application layer. For instance, the data may be sensor data of an IoT device, which regularly needs to transmit small amounts of data, or background traffic/keep alive traffic of a smartphone just to name non-limiting examples. In an example the first and/or second data is control plane data and in particular a RAN notification area update.

As will be explained in more detail below, the first and/or second (and potentially further) data may be transmitted in a two-step or four-step RACH procedure. Alternatively, a CG-based procedure may also be used, i.e. the first and/or second (and potentially further) data may in particular be transmitted in a CG-based PUSCH transmission.

The network of the first aspect comprises at least a network entity, e.g. the network entity of the second aspect. The network may in particular comprise a last serving base station and/or a new serving base station, as will be explained in more detail below.

As already mentioned, the second data may only become available for transmission after the first data has already been transmitted. For instance, the UE may be informed or regularly check whether there is any new data available in the buffer. The described approach can advantageously handle this case, as the UE may now transmit an indication or may already have transmitted an indication in case the data was to be expected thus informing the network and allowing at least a second data transmission during the ongoing small data transmission procedure.

In an example, the indication for requesting transmission of second data is transmitted before receiving, from the network, a (second) message, e.g. a release message. The second release message may be considered as concluding the small data transmission procedure. Thus, the UE should transmit the indication to the network before such release message is received.

Additionally or alternatively, the indication for transmission of second data may only be transmitted after transmitting the first data. This may in particular be the case when additional data becomes available only after the transmission of the first data and/or if such additional data is not expected.

In an example, the indication for transmission of second data is transmitted after receiving a first contention resolution message (which may be considered Msg4 for four-step RACH procedure or MsgB for two-step RACH procedure), which may be received in response to the transmission of the PRACH preamble and the first data. The reason that the network may only send the contention resolution message, i.e. without sending at the same time or in the same MAC payload the release message, may be due to the fact that the network is waiting to see whether the DL data arrives (including application level feedback to the UL SDT) and/or that the network is waiting for the UE context to be fetched.

Alternatively, in further example, the indication for transmission of second data is transmitted as part of a message comprising the first data. For instance, the UE may expect additional data, which is, however, not yet available for transmission at the time of transmitting the first data. Accordingly, the indication for transmission of second data indicating that more data is expected may already be provided together with the first data and in particular as part of the message comprising the first data.

In an example, the indication for transmission of second data is or comprises a scheduling request. As already explained, a scheduling request was previously only defined and used in the RRC connected state and was in particular not supposed to be applicable for a UE in an RRC non-connected state. However, utilizing the concept of a scheduling request for the non-connected state, allows to indicate to the network the presence or the expectation of further data and/or to obtain a scheduling grant, i.e. resources, for transmitting the further data. Generally, a scheduling request (and a scheduling grant) may be used and may have the format(s) as already known e.g. from the RRC connected state.

In a further example, the indication for transmission of second data is or comprises a buffer status report. A buffer status report may in particular contain information on which data and how much data is the buffer of the UE to be sent out. This may allow an efficient scheduling of resources, as only those resources which are needed for transmitting the data in the buffer, can be allocated.

In a further example, the indication for transmission of second data is an indication that more data is expected. For instance, this may be indicated by a specific information field, which may in the simplest form only be a one bit field indicating whether data is expected or not.

In an example, a (first) release message for entering the non-connected state is transmitted to the user equipment. Accordingly, the first release message for entering the non-connected state is received at the user equipment from the network. The release message is sent with information indicating that the UE shall enter the non-connected state instead of the idle or disconnected state. Accordingly, the user equipment may then enter the non-connected state by applying the (first) release message received from the network. For instance, the release message may comprise information (e.g. instructions or parameters), which the UE will apply for the non-connected state. For instance, the release message is sent with a so called suspendConfig, which may comprise information such as a full I-RNTI, short I-RNTI, RAN paging cycle or the like. While, the (first) release message and the subsequent communication may all be transmitted to and received from the same base station (anchor base station), it may also be the case that the base station switches e.g. after the transmittal of the (first) release message from the anchor base station (or last serving base station) to a new serving base station, e.g. because the user equipment has moved into the coverage area of a different base station after entering the non-connected state.

In an example, the transmission of the first data takes place in a four-step RACH procedure.

For this, when the UE is in the non-connected state, a first PRACH preamble may be transmitted from the UE to the network. Accordingly, the first PRACH preamble may be received at the network from the user equipment.

Further, a first random access response (RAR) may be transmitted from the network to the user equipment, in response to the first preamble. Accordingly, the first random access response may then be received at the UE from the network in response to the first random access preamble.

Further, the first data may then be transmitted from the UE in the non-connected state to the network in response to the first random access response. Accordingly, the first data may then be received at the network from the user equipment in response to the first random access response.

Then, a contention resolution message may be transmitted from the network to the user equipment in response to the transmission of the first data. Accordingly, the contention resolution message may then be received at the UE from the network in response to the transmission of the first data. The contention resolution message may be considered as an acknowledgement of a successful completion of the random access procedure (and also regarding the reception of the first data transmission e.g. included in Msg3 (for four-step RACH) and MsgA (in two-step RACH), respectively). The payload of this message may for instance comprise a first number of bytes of the PUSCH payload sent in Msg3 (for four-step RACH) or MsgA PUSCH (for two-step RACH).

Generally, also a two-step RACH procedure may be employed in the same manner in order to transmit the first data. Alternatively, a CG-based small data transmission procedure may also be employed. Generally, the second (and the potential further) data may be transmitted in the same or similar way, as well.

For instance, the first data may be transmitted to the network immediately after the first PRACH preamble and, accordingly, the network entity may receive the first data and the first preamble. The first data may be transmitted in MsgA of a two-step RACH procedure, for instance. Thus, this example may in particular be applicable in case the first data is transmitted as part of a two-step RACH procedure.

The network entity may be configured to transmit, to the user equipment, threshold information whether to transmit the indication for transmission of second data and the user equipment may be configured to receive, from the network, the threshold information whether to transmit the indication for transmission of second data. For instance, in one example, the threshold information may comprise information on how large the data is allowed to be in order to be transmitted via a small data transmission. In another example, the threshold information may comprise information on or representative of a threshold for a probability of additional data to be sent (e.g. appearing in the UE buffer) in order for the UE to send an indication that more data is expected. For instance, the threshold information can be based on the expectation of the UE receiving data from the UE's upper layers, e.g. within a certain time period (e.g. corresponding to the transmission of the SDT and reception of the RRC release message). Assuming that this duration corresponds to a certain (predefined or determined) period or time interval (e.g. x ms), then if the UE estimates that there is a probability higher than a certain (e.g. predefined or calculated) probability (e.g. y %) of a payload being generated from the upper layers, then the UE triggers the indication of more data being expected. This threshold could thus be a certain (e.g. predefined) probability or be related to the y % probability against a x ms period.

The network entity may be configured to transmit, to the user equipment, a resource configuration pertaining to the transmission of the second data (i.e. either to the transmission of the indication of the second data and/or to the transmission of the second data itself). Likewise, the user equipment may be configured to receive, from the network, the resource configuration pertaining to the transmission of the second data. For instance, the resource configuration may indicate resources which can be used directly in order to transmit the second data. Alternatively, the resource configuration may indicate resources for transmitting the indication for second data (e.g. resources for a scheduling request or a buffer status report, for instance), which may in turn result in obtaining resources (such as an upload grant, for instance) in order to then transmitting the second data. It is noted that the transmission of the resource configuration pertaining to the transmission of the second data or the indication thereof may take place before or after receiving the first data.

In this regard, in an example, the user equipment is configured to transmit, to the network, the second data in the small data transmission procedure in the non-connected state based on the resource configuration and, accordingly, the network entity is then further be configured to receive, from the user equipment, based on the resource configuration the second data in the small data transmission procedure. In another example, the user equipment is configured to transmit, to the network, the indication for transmission of second data based on the resource configuration and the network entity is then further be configured to receive, from the user equipment, based on the resource configuration the indication for transmission of second data.

For example, the user equipment may be configured to activate the resource configuration after receiving the first contention resolution message, which may have been received in response to transmitting the first data. As soon as there is new data in the buffer of the UE, the UE can then use the resources indicate by the resource configuration for initiating the transmission of the second data.

In this regard, in an example, the resource configuration may be or comprise a resource configuration for transmitting a scheduling request. The resource configuration may also be or comprise a resource configuration for transmitting a buffer status report. The scheduling request and the buffer status report may each be an example of an indication for transmitting the second data. At the same time, the scheduling request and the buffer status report may each allow the UE to obtain resources for the actual transmission of the second data.

The resource configuration may also be or comprise a resource configuration for a configured grant. The resource configuration may also be or comprise an uplink grant. The configured grant resources and the uplink grant may each be used to directly transmit the second data. Furthermore, the resource configuration may also be or comprise a resource configuration for a (second) random access preamble. The random access preamble may, for instance, initiate a (e.g. second) two-step or four-step RACH procedure (as part of the ongoing small data transmission procedure) for transmitting the second data, as will be described in further detail below. The (second) random access preamble may be associated with configured grant resources (which may also be transmitted with the resource configuration as describe above) and may be used for activating the configured grant resources.

Generally, the resource configuration may be or comprises a resource configuration including one or more PUCCH and/or one or more PUSCH resources.

In an example, the network entity is configured to transmit the resource configuration as part of a (e.g. the first) release message and, accordingly, the user equipment is configured to receive the resource configuration as part of the (first) release message. Additionally or alternatively, the network entity is configured to transmit the above mentioned threshold information as part of a (e.g. the first) release message and, accordingly, the user equipment is configured to receive the threshold information as part of the (first) release message. In another example, the network entity is configured to transmit the resource configuration as part of the (first) contention resolution message in response to the transmission of the first data and, accordingly, the user equipment is configured to receive the resource configuration as part of the (first) contention resolution message in response to the transmission of the first data.

In another example, the network entity is configured to transmit the resource configuration as a broadcast and, accordingly, the user equipment is configured to receive the resource configuration as a broadcast. In one example, the resource configuration may be comprised in a system information block (SIB).

In another example, the network entity is configured to transmit the resource configuration as part of a (second) release message after the reception of the indication and, accordingly, the user equipment is configured to receive the resource configuration as part of a second release message after the transmission of the indication. In that case the UE may ignore and not apply the (second) release message (thus continuing with the small data transmission procedure) and use the resources indicated by the resource configuration (such as an UL grant) to transmit the second data during the small data transmission procedure. The network may thereafter send a further (i.e. third) release message concluding the small data transmission procedure. Alternatively, the UE may also store the release message (or respective information therefrom) and apply the release message later (e.g. after having transmitted the second data and/or when no further data is to be transmitted).

In an example, the user equipment is further configured to check whether second data is available at the user equipment. In case second data is available at the user equipment, the indication for transmission of second data is transmitted and/or the second data is transmitted, to the network, in the non-connected state.

Furthermore, in an example, the UE may analyze a threshold condition. Only in case the size of the (first and/or second) data is below or does not exceed a predefined threshold, the UE will attempt to transmit the respective data in the non-connected state as described herein. In case the size of the (first and/or second) data exceeds a predefined threshold, the UE may not attempt to transmit the respective data in the non-connected state. Rather the UE may request to transition back to the connected state. Also, the network may perform a similar analysis. For instance, if the network determines (e.g. based on a received buffer status report) that the data to be transmitted exceeds a predefined threshold, the network may deny the (further) transmission in the non-connected state and e.g. enforce a transition of the UE into the connected state.

In an example, the user equipment is further configured to transmit, to the network, the second data in the small data transmission procedure in the non-connected state. In the example, the network entity is accordingly further configured to receive, from the user equipment in the non-connected state, the second data in the small data transmission procedure. As explained, the disclosed approach allows not only the indication for transmission of second data but also the second data to be transmitted during the small data transmission procedure in the non-connected state without starting a complete new small data transmission procedure. As mentioned, similarly further data (e.g. third data, fourth data, etc.) may also be indicated and transmitted like the second data.

In an example, the network entity is further configured to transmit, to the user equipment, a second release message. In the example, the user equipment is accordingly configured to receive, from the network a second release message. For instance, the second release message may be sent by the network after having received the second (and any potential further data) in the small data transmission procedure. In other words, a further release message may only be transmitted by the network (and received by the UE) after all the further small data transmissions have been completed. The (second) release message then concludes the small data transmission procedure. However, in an example, it may also be the case that the second data transmission is only transmitted by the UE after having received the (second) release message, e.g. because the resource configuration for the transmission may only be provided with or after the release message. However, in that case, if the UE has second data to be transmitted, the UE can discard the release message, i.e. not apply the release message and first transmit the second data. The UE may then wait for a third (or respective further) release message from the network, which it may then apply if no further data is to be transmitted. Alternatively, the UE may also store the received (second) release message and only apply it later on.

As already mentioned, the second (and any further) data may be transmitted in different ways and in particular similarly to the transmission of the first data and, more specifically, based on a RACH procedure. In an example, the second (and any further) data may be transmitted based on a four-step RACH procedure. In that example, the user equipment is further configured to transmit, to the network, a second random access preamble; receive, from the network, a second random access response in response to the second random access preamble; transmit, to the network, the second data in the non-connected state in response to the second random access response; and/or receive, from the network, a second contention resolution message. In that example, the network entity is accordingly further configured to receive, from the user equipment, a second random access preamble; transmit, to the user equipment, a second random access response in response to the first random access preamble; receive, from the user equipment in the non-connected state, the second data in response to the second random access response; and/or transmit, to the user equipment, a second contention resolution message.

Generally, also a two-step RACH procedure may be employed in the same manner in order to transmit the second data. Specifically in the case of a two-step RACH procedure, the user equipment may transmit, to the network, the second data with the second random access preamble and, accordingly, the network entity may receive the second data with the second random access preamble.

In an example, the network entity is further configured to monitor resources indicated by the transmitted resource configuration pertaining to the transmission of the second data. For instance, the network entity may start monitoring the (e.g. SR) resources after having sent the (first) contention resolution message, which may be transmitted in response to receiving the first data. For instance, the network entity may start monitoring the (e.g. CG) resources after having received the associated random access preamble.

As already mentioned, while, the (first) release message and the subsequent communication may all be transmitted to and received from the same network entity (e.g. anchor base station), it may also be the case that the base station changes e.g. after the transmittal of the (first) release message from the anchor base station (or last serving base station) to a new serving base station, e.g. because the user equipment has moved into the coverage area of a different base station after entering the non-connected state. Specifically for the latter case, the network entity may further be configured to transmit, to a last serving base station, a user equipment context request; and to receive, from a last serving base station, a user equipment context response.

It is to be understood that the presentation of the embodiments disclosed herein is merely by way of examples and non-limiting.

Herein, the disclosure of a method step shall also be considered as a disclosure of means for performing the respective method step. Likewise, the disclosure of means for performing a method step shall also be considered as a disclosure of the method step itself.

Other features of the present disclosure will become apparent from the following detailed description considered in conjunction with the accompanying drawings. It is to be understood, however, that the drawings are designed solely for purposes of illustration and not as a definition of the limits of the present disclosure, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 6a-b are exemplary signaling charts illustrating examples of the different aspects of the present disclosure;

The following description serves to deepen the understanding of the present disclosure and shall be understood to complement and be read together with the description of example embodiments of the present disclosure as provided in the above SUMMARY section of this specification.

While the specific radio system in the examples below is 5G, this is only to be considered a non-limiting example. Also, in the following examples the RRC inactive state is described as an example of the non-connected state. However, the examples may generally also be applied to other non-connected states, such as an RRC idle state, for instance.

Figure 1:
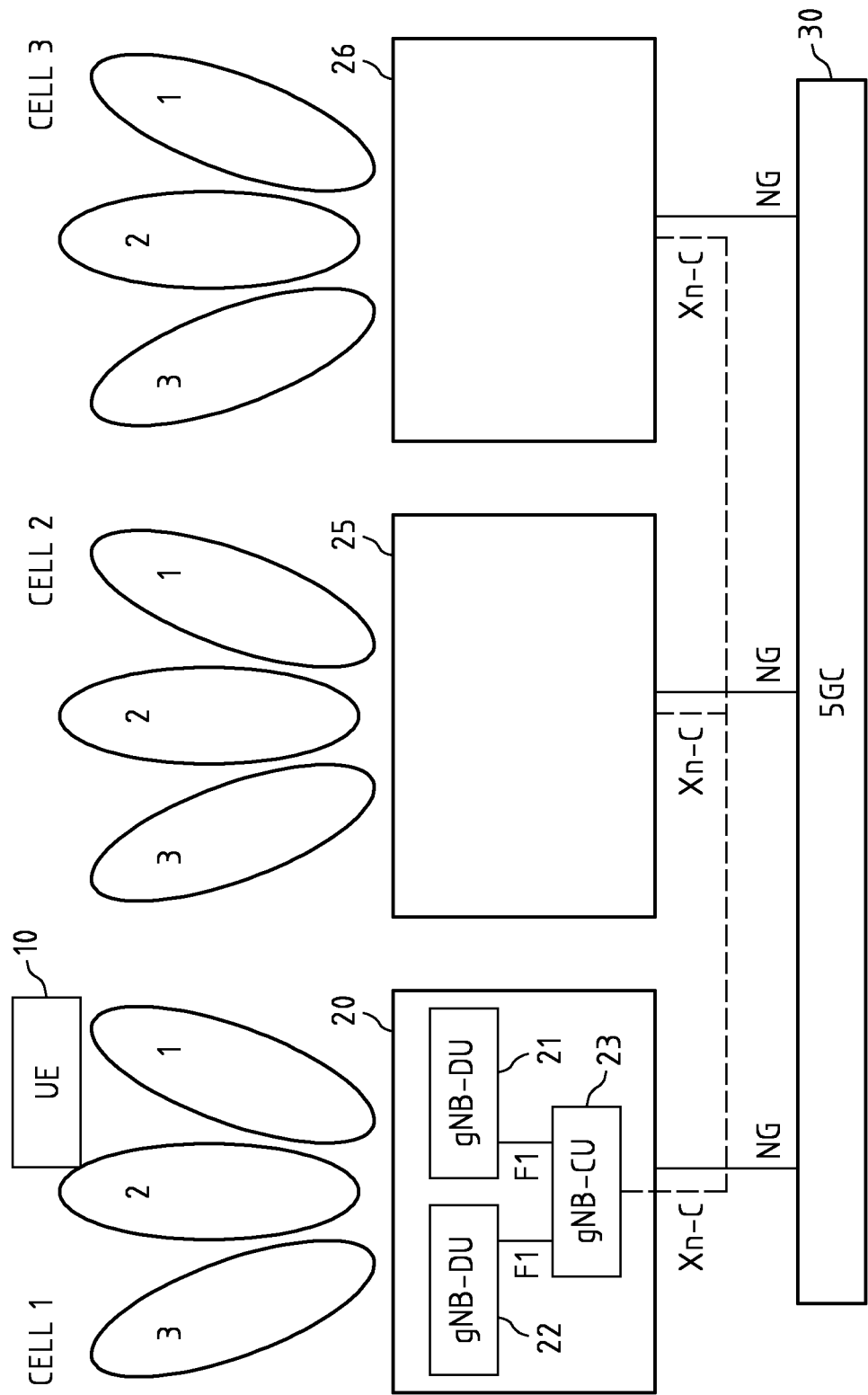
FIG. 1 is a schematic diagram illustrating an example radio environment in which exemplary embodiments of the present disclosure may be performed.

FIG. 1 shows an example environment, in which the present disclosure may be applied. FIG. 1 shows a 5G communication network, which introduces the New Radio technology and also an architecture for which the different sublayers of the RAN may be split into two logical entities in a communication network control element (like a BS or gNB), which are referred to as distributed unit (DU) and central unit (CU). For example, the CU is a logical node that controls the operation of one or more DUs over a front-haul interface (referred to as F1 interface). The DU is a logical node including a subset of the gNB functions, depending on the functional split option.

As shown in FIG. 1, a user equipment (UE) 10 such as a mobile device is connected to a cell 1 of a base station, a gNB 20 via a communication beam of the cell 1. In the example shown in FIG. 1, the gNB 20 is provided with a CU 23 and two DUs 21 and 22 being connected to the CU 23 by a F1 interface. Furthermore, as shown in the example of FIG. 1, there is a plurality of further cells (in FIG. 1, for illustrative purposes, two cells, i.e. cell 2 and cell 3 are shown) to which the UE 10 can connect. Similarly to cell 1, cells 2 and 3 are controlled by gNB 25 and 26, respectively, and each provides a plurality of beams 1 to 3. The different beams of a 5G network may be used for beam diversity or beam hopping.

As shown in FIG. 1, each base station or gNB of the cells is connected to a core network, such as a 5GC, via respective interfaces, indicated as NG interfaces. Furthermore, each gNB of the cells is connected with each other by means of a specific interface, which is referred to e.g. as an Xn-C interface.

Any of the network entities, such as the gNB, gNB-DU, gNB-CU and/or 5GC, may individually or together be an example of a network entity according to the second aspect of the invention.

On a general level, it is noted, that in NR a small data transmission is configured by the network on a per DRB basis. The minimum number of DRBs that a UE shall currently support in NR is 16 without duplication and 8 per MAC entity with duplication. Up to 29 DRBs can be added in DRB-ToAddModList, where each DRB is identified by its DRB-Identity. Also, all the configured DRBs are suspended by a UE upon reception of a RRC Release message with SuspendConfig. The Buffer Size Report (BSR) sent via a MAC CE from the UE to the gNB to indicate the amount of pending data in the uplink buffer allows for an explicit Buffer Size bit field per Logical Channel Group (LCG) in NR. Dedicated MAC CE formats allow to send a Short (Truncated) BSR and a Long (Truncated) BSR, indicating the Buffer Size index corresponding to the actual Buffer size levels (in bytes) for one or more LCG. The network (gNB)

can then schedule uplink resources to each UE based on the QoS characteristic of the corresponding DRBs as per the BSR. The LCG is used for constructing a consolidated reporting of the buffer status for signaling overhead efficiency (i.e. the buffer status is reported aggregating the data across a group of LCHs assigned to the same LCG). On the contrary, the resources allocation is done according to the logical channels. The mapping of a radio bearer and logical channel to a Logical Channel Group is done at radio bearer setup time by the gNB via RRC signaling and is based on the corresponding QoS attributes of the radio bearers. Current BSR triggers comprise that new data arrives in previously empty buffers; that higher priority data arrives after the UE has already sent a BSR and is waiting for a grant; that the UE needs to update the gNB about the status of buffers, e.g. periodically according to periodic BSR-Timer; that a BSR retransmission has to be sent according to retx BSR-Timer to provide BSR robustness.

In the RRC connected state, with dynamic UL scheduling, when the UE wants to transmit a new data packet, it triggers transmission of a scheduling request (SR) on physical resources assigned for physical uplink control channel (PUCCH) to ask the network for a scheduling grant (SG)—if PUCCH resources have been assigned. According to the current specifications, the UE is configured with PUCCH format 0 or 1 for sending the SR. Also, for transmitting multiple uplink control information (UCI) types (e.g. CSI, HARQ-ACK) the UE can be configured to transmit the SR with other PUCCH formats (e.g. formats 2-4). The SR can be transmitted also over UCI multiplexing in PUSCH when UCI and PUSCH transmissions coincide in time, either due to transmission of a UL-SCH transport block or due to triggering of A-CSI transmission without UL-SCH transport block.

The UE AS Context that is stored at a UE while in the RRC inactive state and at the last serving gNB (also called anchor gNB or old NG-RAN node in the following), may include:
- the current RRC context, incl. the suspended RRC configuration (and UE radio capability);
- the current AS security context (incl. UE security capabilities and security information);
- the current configuration of the suspended DRBs incl.
  the PDCP state including ROHC state,
  SDAP configuration, and
  RLC configuration;
- C-RNTI used in the source PCell, the cellIdentity, and the physical cell identity (PCI) of the source Pcell.

Therein, the last serving gNB is the gNB that acts as an anchor for the RRC inactive UE, storing the UE AS Context and maintaining e g the Core Network functionalities (CN-level paging, user-plane connectivity to the CN, etc.).

Figure 2A:
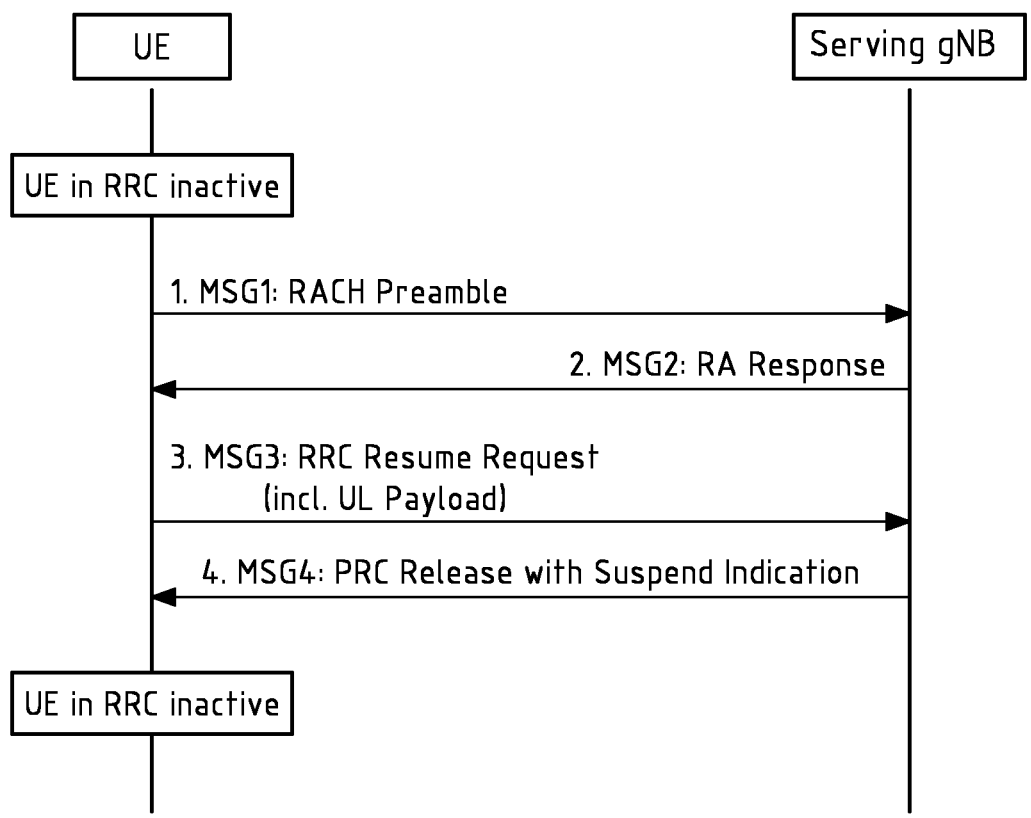
FIG. 2a-c are exemplary signaling charts illustrating three small data transmission approaches, in which the approach of the present disclosure may be employed.
Figure 2B:
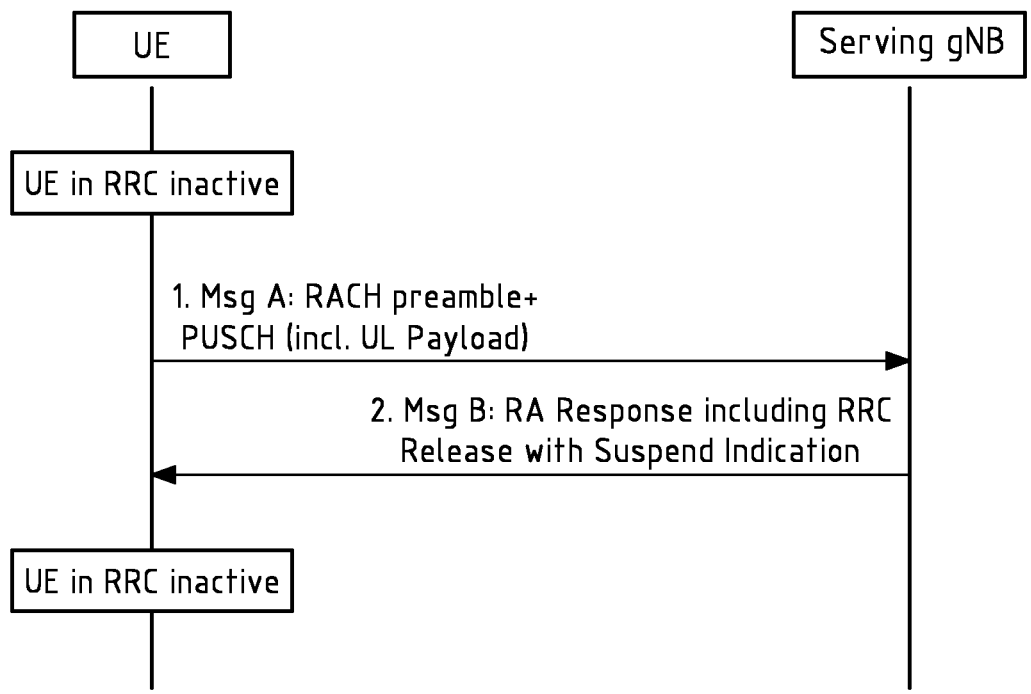
Figure 2C:
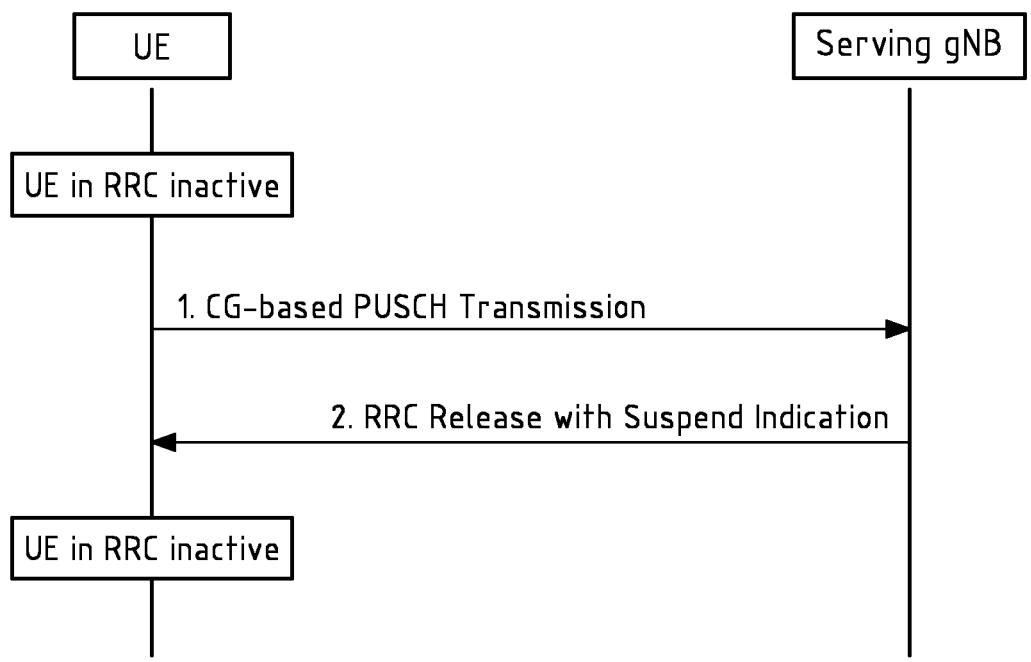

Turning now to FIGS. 2a-c, these show exemplary signaling charts illustrating three SDT approaches, in which the approach of the present disclosure may be employed. FIG. 2a shows an RRC-based four-step SDT, FIG. 2b shows an RRC-based two-step SDT, FIG. 2c shows an RRC based CG based SDT. The described aspects of the present disclosure may be implemented in any of these approaches.

Figure 3:
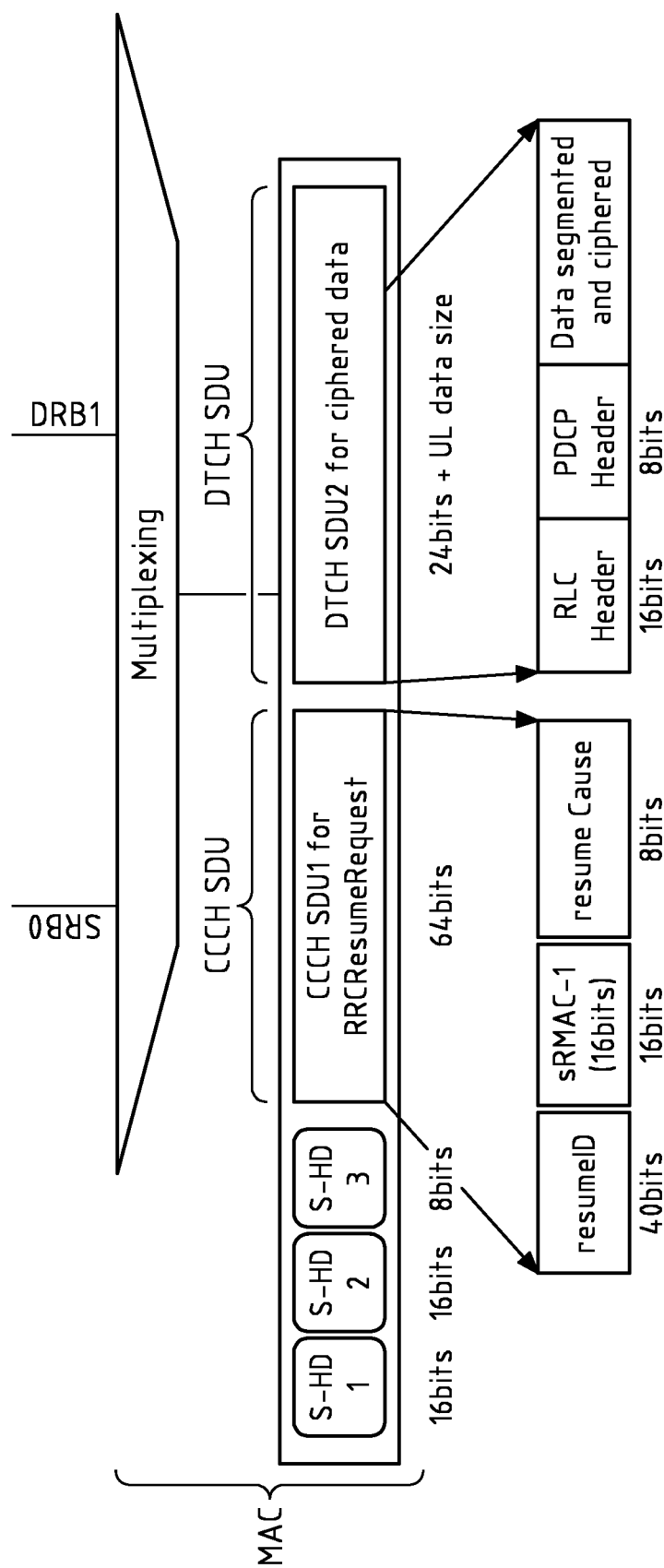
FIG. 3 is an exemplary diagram of the content of an UL MAC PDU, which may be used for transmitting data in an RRC based small data transmission.

FIG. 3 is an exemplary diagram of the content of an UL MAC PDU, which may be used for transmitting data in an RRC based small data transmissions in the aspects described in the present disclosure, e.g. in Msg3, MsgA or in a CG-based small data transmission as illustrated in FIG. 2 or in any of the Msg3 of FIG. 5-7. In this case the PDU is a RRC resume request (CCCH SDU1 comprising the resumeID, sRMAC-I and the resume Cause) combined with the data (DTCH SDU2 comprising an RLC header, a PDCP header and the data).

Figure 4:
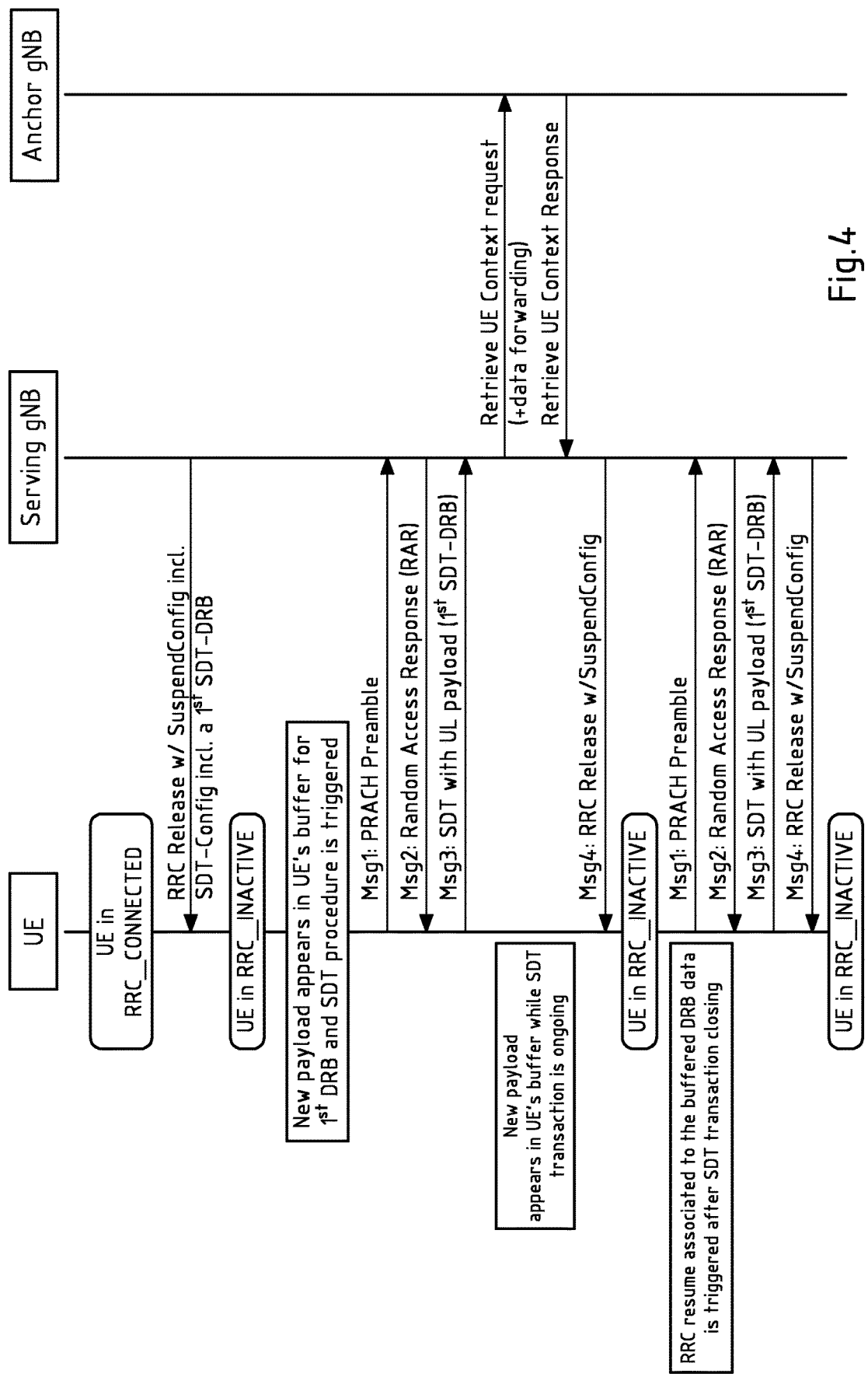
FIG. 4 is comparative signaling chart illustrating the handling of new data appearing in the UE buffer during a small data transmission procedure for a UE in RRC inactive when not implementing the approach of the present disclosure.

FIG. 4 is a comparative signaling chart illustrating the handling of new data appearing in the UE buffer during a small data transmission procedure for a UE in RRC inactive if the approach of the aspects of the present disclosure is not implemented. First, the UE is in the RRC connected state. The UE then receives a (first) RRC release message with suspendConfig (comprising relevant parameters for the inactive state) and instructing the UE to transition to the RRC inactive state. The RRC release message also comprises a small data transmission configuration for a first dedicated radio bearer (DRB) for the SDT. After the UE has transitioned to the inactive state, new payload data appears in the UE buffer for the first DRB. This triggers the SDT procedure, in which the UE transmits a PRACH preamble (Msg1) to a gNB, in this case a new serving gNB, which responds with a random access response (Msg2). The UE then transmits first data (UL payload) via the first SDT-DRB (Msg3) to the new serving gNB. In the meantime the new serving gNB transmits a UE context request and receives a UE context response from the last serving gNB. Furthermore, new payload again appears in the UE buffer after having transmitted the UL payload but while the SDT procedure is still ongoing. The UE then receives a (second) RRC release message with suspendConfig for transitioning (or keeping) the UE into the inactive state. The UE applies the release message, the SDT procedure is terminated and the UE is in the inactive state. In order to transmit the new payload in a SDT, the UE would now need to repeat the above procedure comprising Msg1 to Msg4, as illustrated in FIG. 4. In other words a second, new SDT procedure would need to be started.

It will now be explained with reference to FIGS. 5 to 7, how the UE is configured in the RRC inactive state to indicate that new data has become available during an ongoing small data transmission (SDT) procedure and, specifically, after the UE has already sent the first UL small data (e.g. in Msg3 or MsgA of a random access procedure, or in a CG transmission). As will become apparent, this avoids that the UE has to trigger a new subsequent SDT procedure after completing the ongoing SDT procedure, which would be resource inefficient.

FIG. 5a-d show exemplary signaling charts illustrating examples of the different aspects of the present disclosure. In these examples, a configuration of physical resources for sending an indication of second data (e.g. SR/BSR) is activated upon the completion of the contention resolution associated with the transmission of the first UL small data.

Figure 5A:
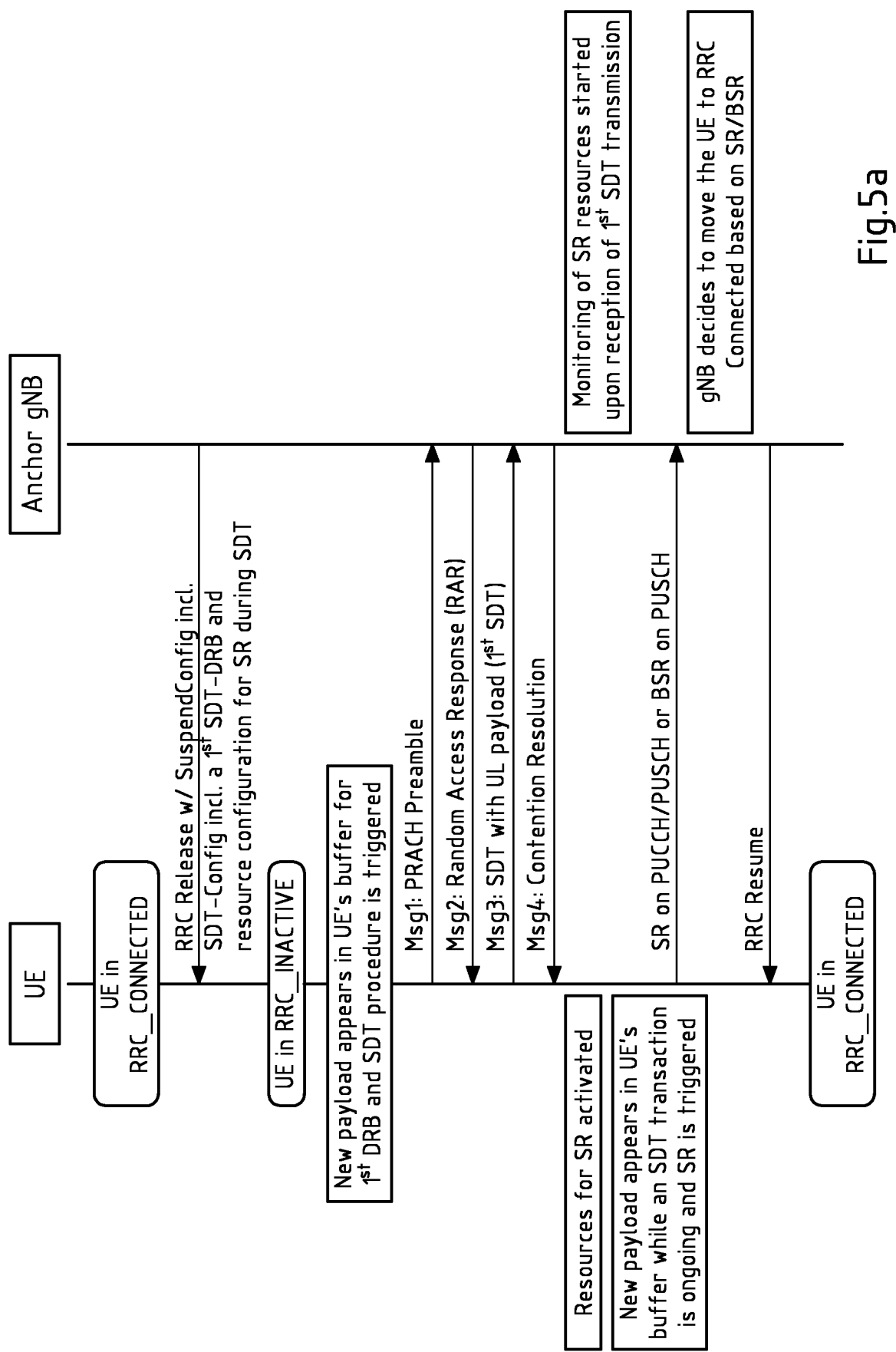
FIG. 5a-d are exemplary signaling charts illustrating examples of the different aspects of the present disclosure.
Figure 5B:
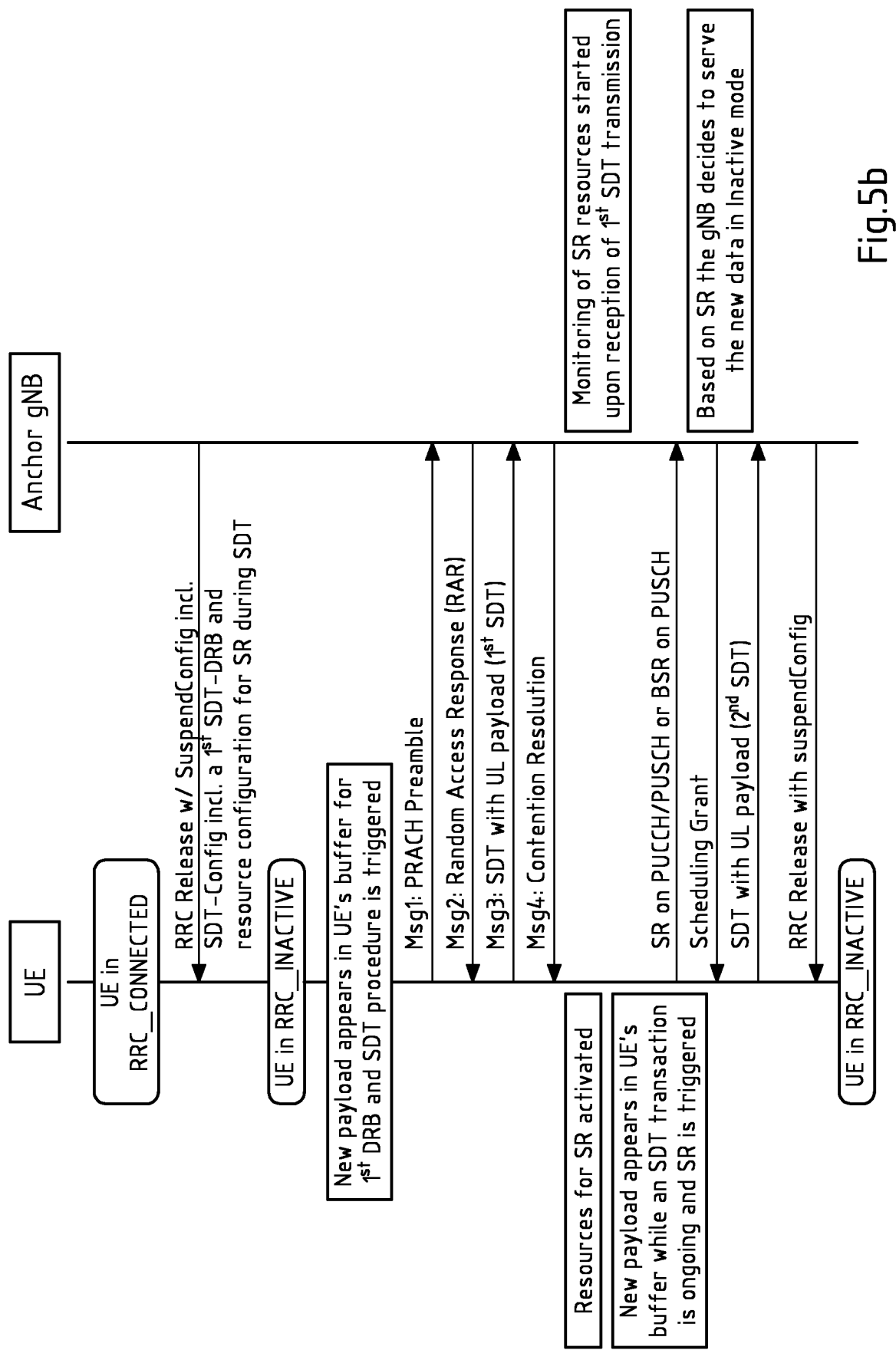

FIGS. 5a and 5b illustrate the case of a SDT with only one gNB (anchor gNB) involved. In these two examples, pre-configured resources for SR and/or BSR are pre-assigned at the (first) RRC release to inactive state and are used by the UE during the SDT procedure i.e. after it receives the contention resolution message.

In more detail, in the example of FIG. 5a, first, the UE is in the RRC connected state. The UE then receives a (first) RRC release message with suspendConfig (comprising parameters for the inactive state) and instructing the UE to transition to the RRC inactive state. The RRC release message also comprises a small data transmission configuration for a first dedicated radio bearer (DRB) for the SDT of the first data. Moreover, the first release message also comprises a resource configuration for a scheduling request during the SDT procedure. After the UE has transitioned to the inactive state, new payload data appears in the UE buffer for the first DRB. This triggers the SDT procedure, in which the UE transmits a PRACH preamble (Msg1) to a gNB, in this case the anchor gNB, which has also transmitted the first RRC release message and which responds with a random access response (Msg2). The UE then transmits first data (UL payload) via the first SDT-DRB (Msg3) to the anchor gNB. The anchor gNB responds with a content resolution message (Msg4). The UE then activates the SR resources already received earlier with the first RRC release message. Also, the anchor gNB has already started monitoring of the SR resources after having received the first UL payload, in order to be prepared to receive second data from the UE anytime.

The reason that the network only sends the contention resolution message (Msg4), i.e. without sending in the same MAC payload the RRC release message (to move the UE to the RRC inactive state), may be due to the anchor gNB waiting to see whether the DL data arrives (including application level feedback to the UL SDT) or waiting for the UE context to be fetched, for instance.

Then, after having transmitted the first UL payload, a new payload (second data) appears in the UE buffer, while the SDT procedure is still ongoing. The UE then transmits an indication to the anchor gNB by using the SR resources for transmitting a scheduling request (via PUCCH or PUSCH) to the anchor gNB. Alternatively, the UE may use the resources for transmitting a buffer status report (via PUSCH). In any case, in the example of FIG. 5a, the gNB determines (based on the received SR/BSR) that the second data is too large, i.e. it exceeds a predefined threshold, and decides to transition the UE to the RRC connected state. The gNB therefore transmits an RRC resume message (without suspendConfig). The UE receives the RRC resume message. The UE applies the resume message and transitions to the RRC connected state for transmitting the second data.

In contrast, in the example shown in FIG. 5b, the second data is small enough to be send in a small data transmission procedure. Therefore, the anchor gNB transmits a scheduling grant in response to the SR or BSR of the UE. The UE can then transmit the new payload (second data) to the anchor gNB still within the same SDT procedure. Only then the gNB transmits the (second) RRC release message with suspendConfig in order to instruct the UE to move in the RRC inactive state. The UE receives and applies the release message and transitions to or remains in the RRC inactive state. Thus, the UE can be considered to have never left the inactive state, it may however apply new or different configured parameters for the inactive state (such as the inactive temporary identifier (I-RNTI) and/or the Next Hop Chaining Counter (NCC) provided to it as part of the RRC release message (i.e. the suspendConfig).

Figure 5C:
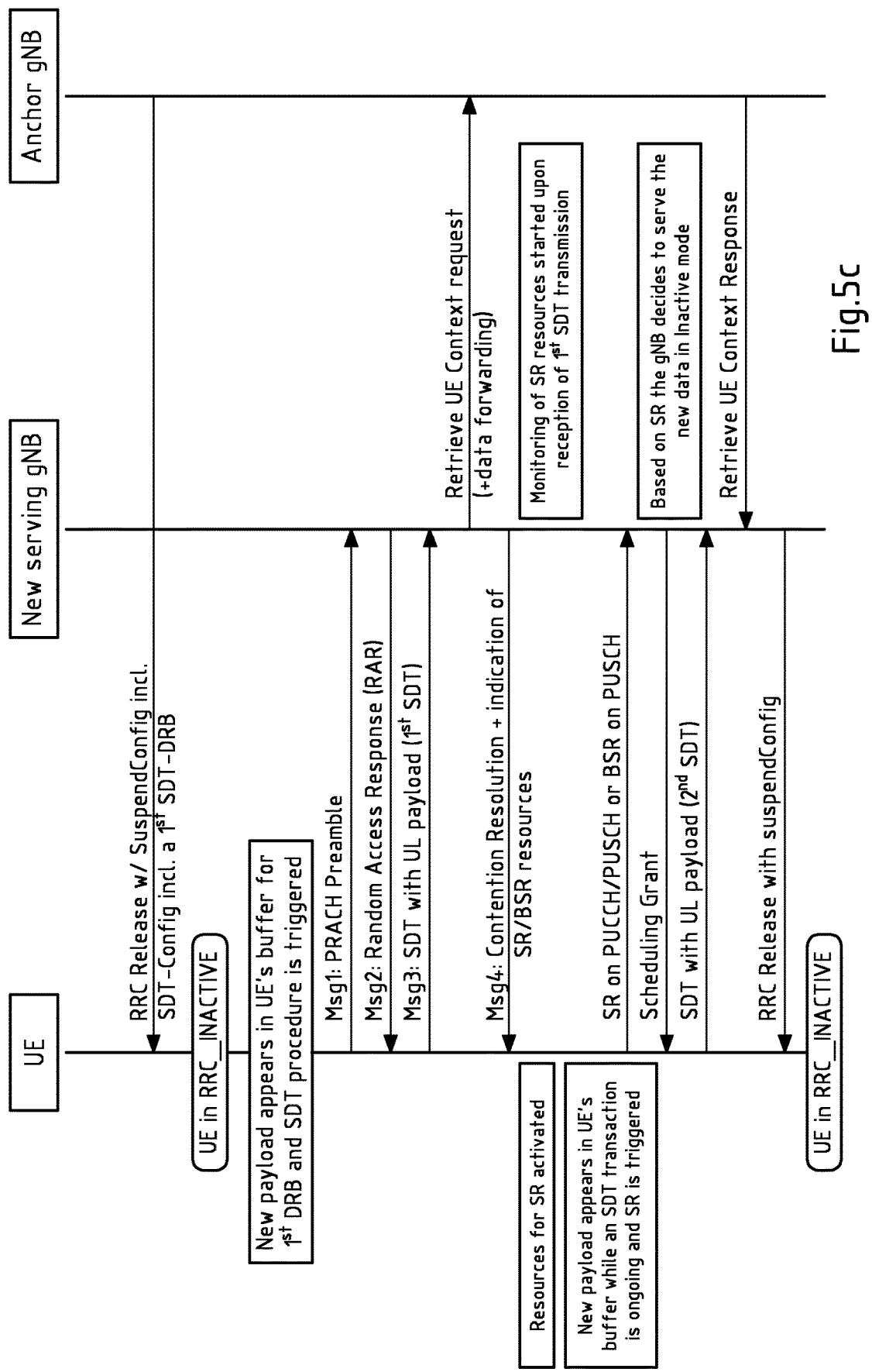
Figure 5D:
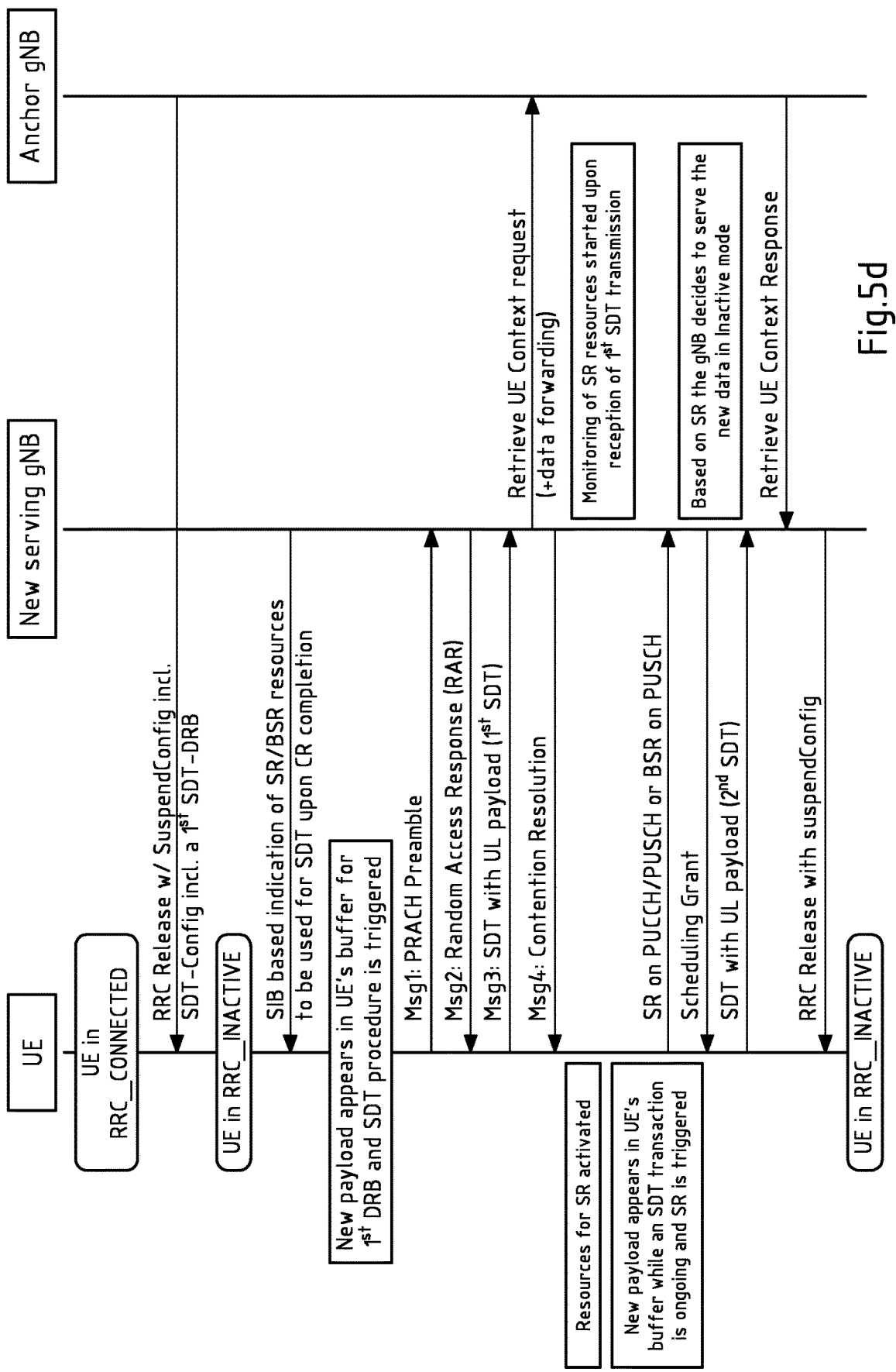

FIGS. 5c and 5d pertain to the case, where the two base stations involved, as the SDT procedure is performed in a different (non-anchor or new serving) gNB.

FIG. 5c basically describes an example, in which the network can provide dedicated resources for SR and/or BSR at the time it sends the contention resolution message to the UE.

In more detail, in the example of FIG. 5c, first, the UE (which may generally be in any state) receives a (first) RRC release message with suspendConfig (comprising parameters for the inactive state) and instructing the UE to transition to the RRC inactive state. The RRC release message also comprises a small data transmission configuration for a first DRB for the SDT of the first data. After the UE has transitioned to the inactive state, new payload data appears in the UE buffer for the first DRB. This triggers the SDT procedure, in which the UE transmits a PRACH preamble (Msg1) now to a gNB, in this case a new serving gNB (e.g. because the UE may have moved out of the coverage of the anchor gNB). The new serving gNB responds with a random access response (Msg2). The UE then transmits first data (UL payload) via the first SDT-DRB (Msg3) to the new serving gNB. The new serving gNB transmits a UE context request to the anchor gNB and also responds with a content resolution message (Msg4) to the UE. The content resolution message also comprises a resource configuration for the SR and/or BSR resources and the UE activates the respective resources. Also, the new serving gNB has already started monitoring the SR resources after having received the first UL payload, in order to be prepared to receive second data from the UE anytime.

Then, after having transmitted the first UL payload, a new payload (second data) appears in the UE buffer, while the SDT procedure is still ongoing. The UE then transmits an indication to the new serving gNB by using the SR resources for transmitting a scheduling request (via PUCCH or PUSCH) or buffer status report (via PUSCH) to the new serving gNB. In response, the new serving gNB transmits a scheduling grant. The UE can then transmit the new payload (second data) to the new serving gNB still within the same SDT procedure. In the meantime the new serving gNB has also received the UE context response. The new serving gNB then transmits the (second) RRC release message with suspendConfig to the UE in order to instruct the UE to move in the RRC inactive state. The UE receives and applies the release message and transitions to or remains in the RRC inactive state.

The example of FIG. 5d is the same as in FIG. 5c, however, in the example of FIG. 5d, instead of transmitting the resource configuration with the contention resolution message, the network broadcasts the SR/BSR resource configuration (e.g. PRACH preambles, PUCCH occasions) to be used by the UEs during the SDT procedure after the reception of contention resolution message. The UEs then based on an unique identifier (such as the TC-RNTI which is also know to the network) can then select one of the indicated SR/BSR resources, in order to avoid collisions with other devices.

It is noted that for any of the cases above, the UE can transmit multiple SRs in order to acquire multiple dynamic UL grants, enabling in this way a multi-shot SDT procedure with more than one subsequent UL payload (i.e. also transmitting third, fourth, etc. data). In practice, as the number of configured resources (e.g. resource occasions) for the transmission of SR/BSR is limited, then that corresponds to effectively limiting the maximum number of subsequent SDT UL transmissions that are in effect supported within a multi-shot SDT procedure.

Figure 6B:
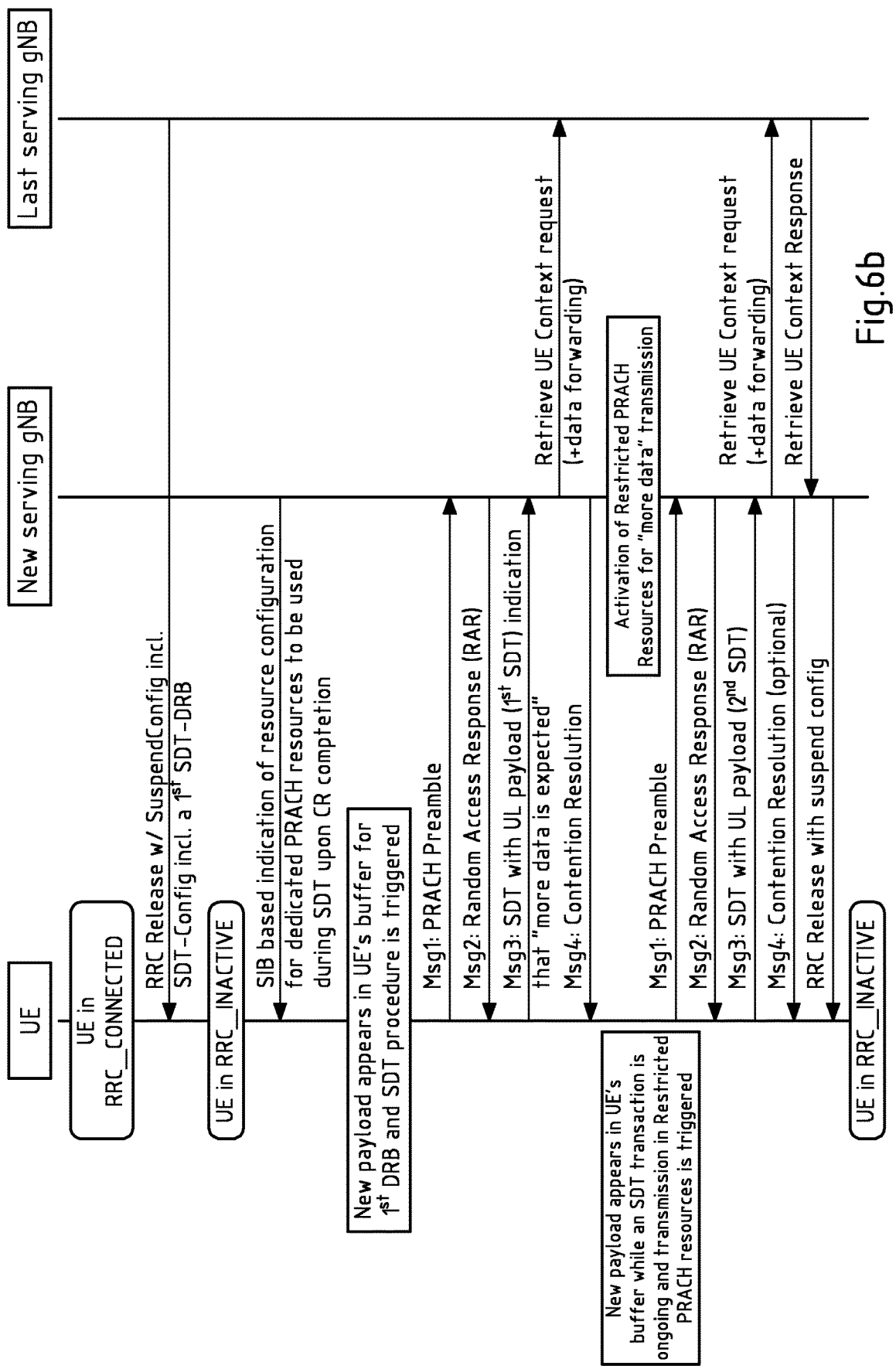

FIGS. 6a and 6b show further exemplary signaling charts illustrating examples of the different aspects of the present disclosure. In these examples, a configuration of physical resources for sending the second data is activated to be valid in the time period between the initial SDT (upon the completion of the contention resolution) and the completion of the SDT procedure (i.e. until the RRC release or resume message is received and applied by the UE, which depending on the release message may then transition into RRC idle, RRC inactive or RRC connected).

The example of FIG. 6a relates to the case, where only one gNB is involved. In this embodiment pre-configured CG resources are activated by the UE sending a special PRACH preamble and upon the network's reception of such dedicated PRACH preamble (e.g. a contention free preamble paired or associated with the indication that the new UL SDT payload has arrived to the UE's buffer) or a SR/PUCCH resource. A RAR is not necessary for such a special preamble.

In more detail, in the example of FIG. 6a the UE is in the RRC connected state. The UE then receives a (first) RRC release message with suspendConfig (comprising parameters for the inactive state) and instructing the UE to transition to the RRC inactive state. The RRC release message also comprises a small data transmission configuration for a first DRB for the SDT of the first data. Moreover, the first release message also comprises a resource configuration for CG resources to be used for subsequent UL data (second data) with a paired dedicated second PRACH preamble for CG resource activation. After the UE has transitioned to the inactive state, new payload data appears in the UE buffer for the first DRB. This triggers the SDT procedure, in which the UE transmits a PRACH preamble (Msg1) to a gNB, in this case the anchor gNB, which has also transmitted the first RRC release message and which responds with a random access response (Msg2). The UE then transmits first data (UL payload) via the first SDT-DRB (Msg3) to the anchor gNB. This message also comprises an indication for transmission of second data, indicating that more data is expected. The anchor gNB responds with a content resolution message (Msg4). A new payload (second data) appears in the UE buffer, while the SDT procedure is still ongoing. This triggers the UE to transmit the second PRACH preamble (which is associated with the CG resources) to the anchor gNB. The gNB detects the second PRACH preamble and activates the monitoring of the CG occasions. The UE then uses the resources of the configured grant for transmitting the new payload (second, third, etc. data) to the anchor gNB still within the same SDT procedure. Only then the gNB transmits the (second) RRC release message with suspendConfig in order to instruct the UE to move in the RRC inactive state. The UE receives and applies the release message and transitions to or remains in the RRC inactive state.

FIG. 6b relates to the case of an SDT procedure with a different (non-anchor) gNB. Like in the embodiment of FIG. 6a, an RA-based SDT is performed using dedicated PRACH occasions and preambles. However, the resource configuration associated with this PRACH occasions/preambles are in this case broadcast by the current serving gNB.

In more detail, in the example of FIG. 6b, the UE receives a (first) RRC release message with suspendConfig (comprising parameters for the inactive state) and instructing the UE to transition to the RRC inactive state. The RRC release message also comprises a small data transmission configuration for a first DRB for the SDT of the first data. The UE applies the RRC release message and transitions to the inactive state. A broadcast message (here via system information blocks, SIB) transmitted by the new serving gNB and received by the UE comprises a resource configuration for resources for a dedicated second PRACH preamble to be used during the SDT procedure upon completion of the contention resolution. New payload data appears in the UE buffer. As before, this triggers the SDT procedure, in which the UE transmits a PRACH preamble (Msg1) to the new serving gNB based on the information from the first RRC release message. The new serving gNB responds with a random access response (Msg2). The UE then transmits the first data (UL payload) via the first SDT-DRB (Msg3) to the new serving gNB. This message also comprises an indication for transmission of second data, indicating that more data is expected. The new serving gNB transmits a UE context request to the anchor gNB and responds to the UE with a content resolution message (Msg4). This triggers, at the new serving gNB, the activation of restricted PRACH resources for the transmission of the additional second data. When such a new payload (second data) appears in the UE buffer, this triggers the UE to transmit the second restricted PRACH preamble (as instructed in the broadcast) to the new serving gNB (second Msg1). The gNB detects this PRACH preamble and responds with a random access response (second Msg2). The UE then transmits the new payload to the new serving gNB (second Msg3) still within the same SDT procedure. The new serving gNB may again request and retrieve the UE context from the last serving gNB. Optionally, the network can respond with a contention resolution message (second Msg4) to the UE. The gNB transmits the (second) RRC release message with suspendConfig in order to instruct the UE to move in the RRC inactive state. The UE receives and applies the release message and transitions to or remains in the RRC inactive state.

FIG. 7a-d show further exemplary signaling charts illustrating examples of the different aspects of the present disclosure. In these examples, the network sends an UL grant (in a MAC CE) together with the RRC Release message. The UE then uses the granted resources to indicate (e.g. via an BSR or other MAC CE with the same purpose) if any SDT data has arrived in the meantime. These embodiments are each applicable for both an SDT procedure at the anchor gNB and at a non-anchor gNB.

Figure 7A:
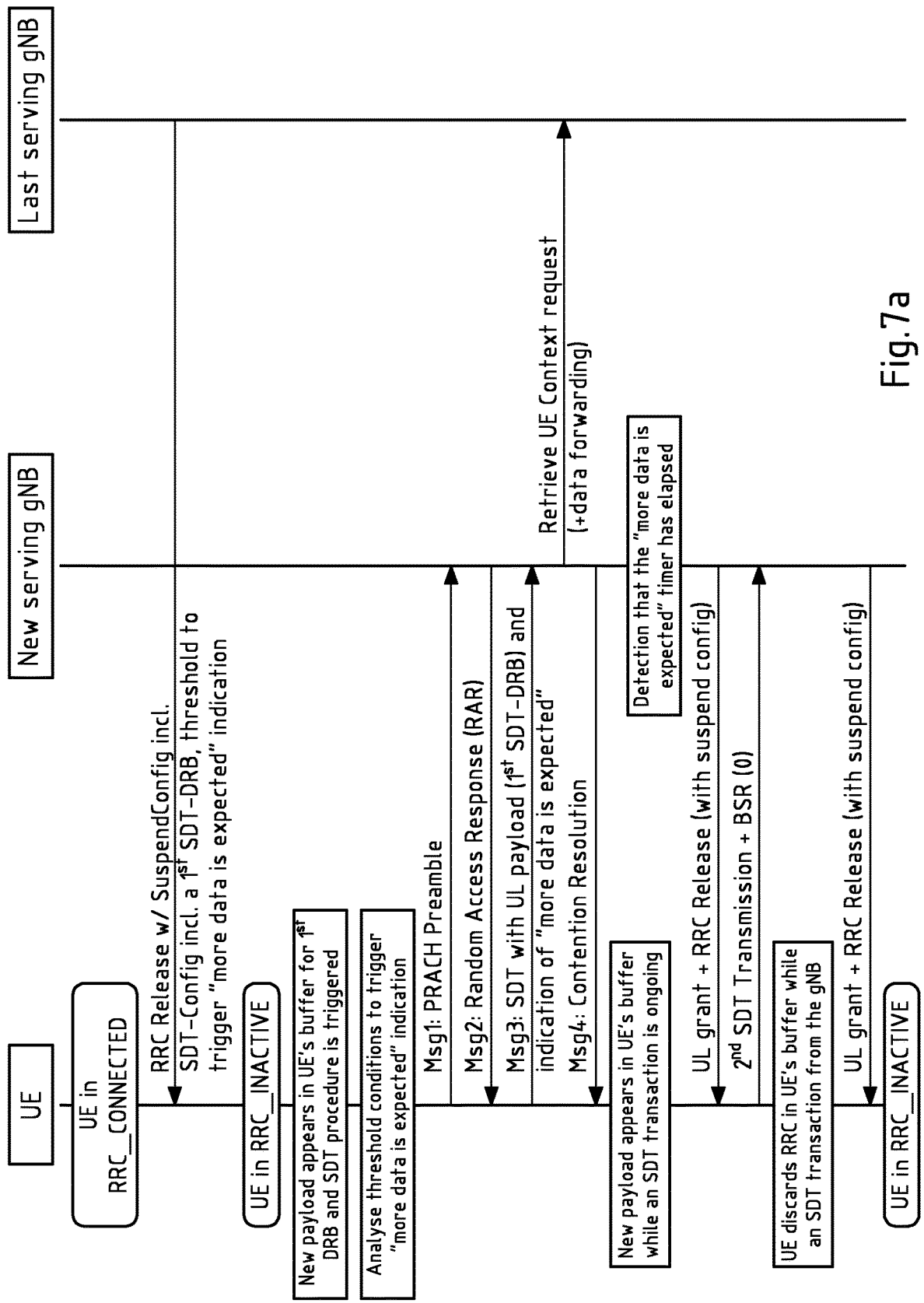
FIG. 7a-d are exemplary signaling charts illustrating examples of the different aspects of the present disclosure.
Figure 7B:
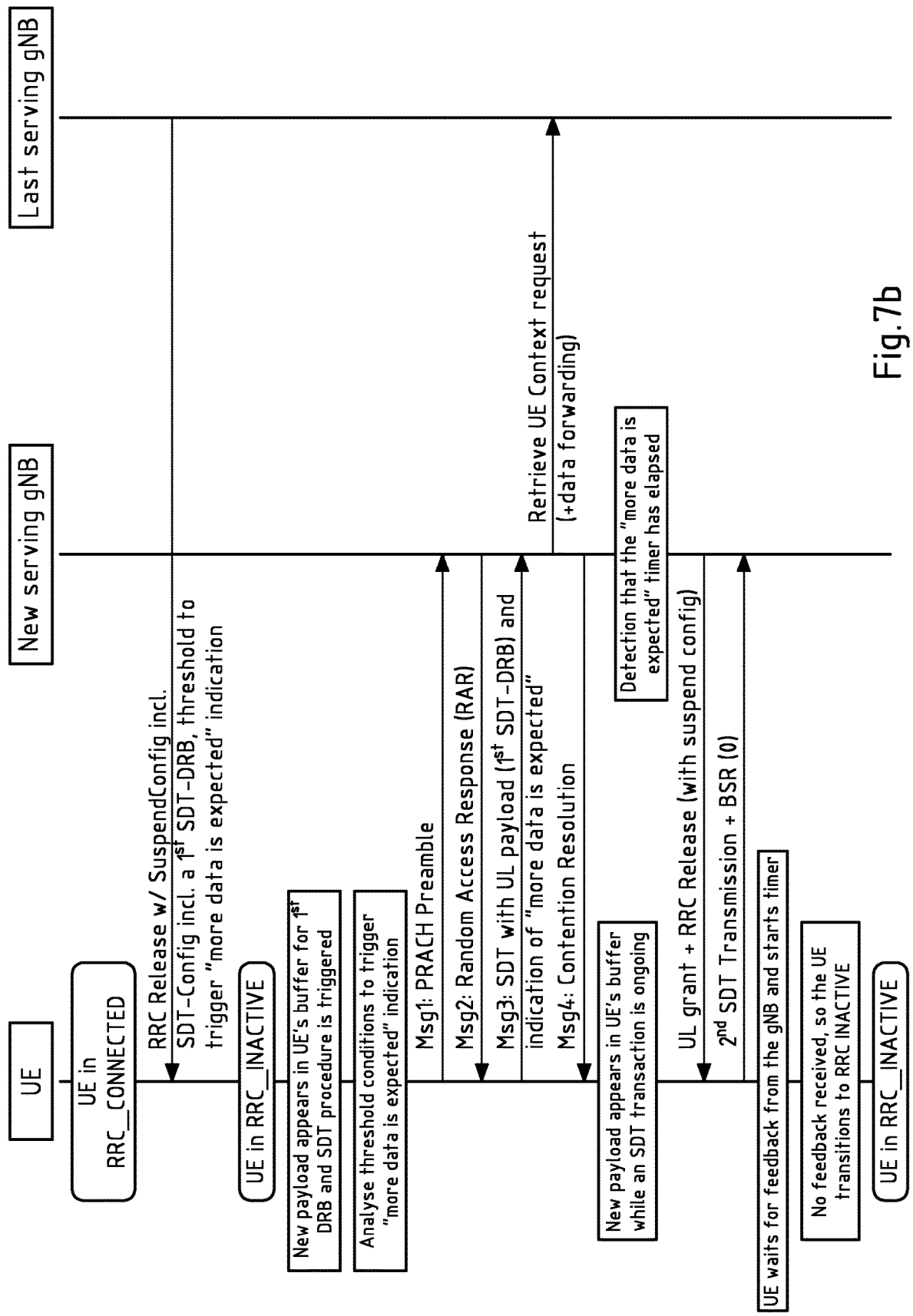

FIGS. 7a and 7b pertain to the case, where the UE's buffer is not empty.

In more detail, in FIG. 7a the UE is in the RRC connected state. The UE then receives a (first) RRC release message with suspendConfig (comprising parameters for the inactive state) and instructing the UE to transition to the RRC inactive state. The RRC release message also comprises a small data transmission configuration for a first DRB for the SDT of the first data. Moreover, the first release message also comprises information on a threshold to trigger an indication for the transmission of second data. For instance, this threshold can be based on the expectation of the UE receiving data from the UE's upper layers within a time period corresponding to the transmission of the SDT and reception of the RRC release message. Assuming that this duration corresponds to a certain (predefined or determined) period or time interval (e.g. x ms), then if the UE estimates that there is a probability higher than a certain (e.g. predefined or calculated) probability (e.g. y %) of a payload being generated from the upper layers, then the UE triggers the indication of more data is expected. This threshold could thus be a certain (e.g. predefined) probability or be related to the y % probability against an x ms period.

After the UE has transitioned to the inactive state, new payload data appears in the UE buffer for the first DRB. The UE analyzes the threshold condition based on the information provided by the network and the SDT procedure is triggered, as already described before, i.e. the UE transmits a PRACH preamble (Msg1) to the gNB, in this case the new serving gNB (but the same applies in case of the anchor gNB), which responds with a random access response (Msg2). The UE then transmits the first data (UL payload) via the first SDT-DRB (Msg3) to the gNB. In case the threshold condition is fulfilled, this message also comprises an indication for transmission of second data, indicating that more data is expected. The responsible gNB responds with a content resolution message (Msg4). In case the gNB is a new serving gNB, it may request the UE context, as described before. A new payload (second data) then appears in the UE buffer, while the SDT procedure is still ongoing. Also, the gNB has started a timer, during which it expects more data to be available for transmission in the UE's buffer. The expiry of the timer, triggers the gNB to transmit a UL grant together with a RRC release message (with suspend-Config). The UE will discard the RRC release message and use the UL grant for transmitting the new payload (second data) to the anchor gNB still within the same SDT procedure. The UE may also send a buffer status report indicating that no further data is available (BSR(0)).

The UE waits for feedback from the gNB. The gNB sends a further RRC release message (with suspendConfig). The UE receives and applies the release message and transitions to or remains in the RRC inactive state.

In the example of FIG. 7b, the only difference is that the UE instead of discarding the (second) RRC release message, the UE stores the content of the RRC release message and, as before, uses the received UL grant for transmission of the second data. The UE may then apply the stored RRC release message e.g. based on a network indication or according to a timer.

Figure 7C:
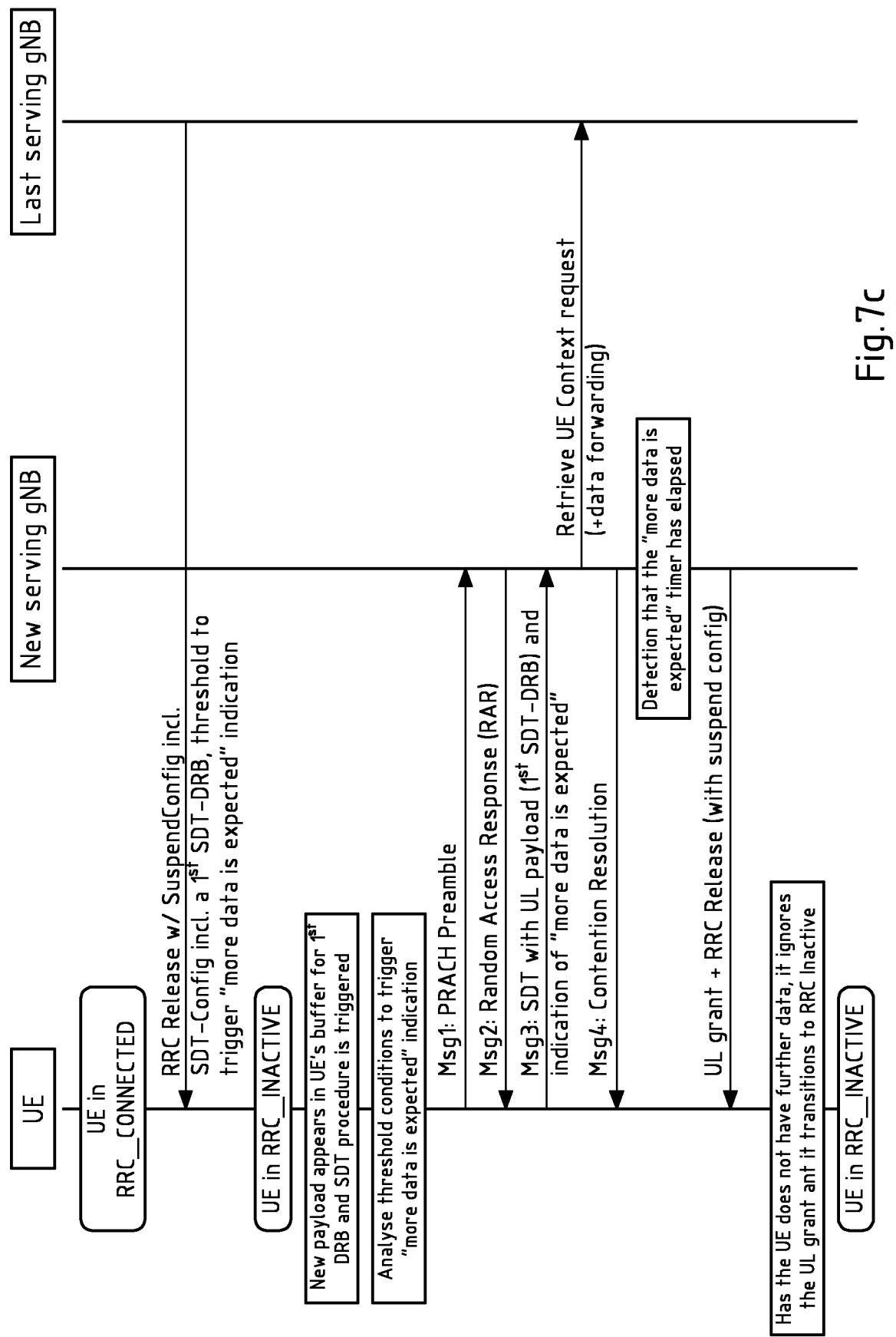
Figure 7D:
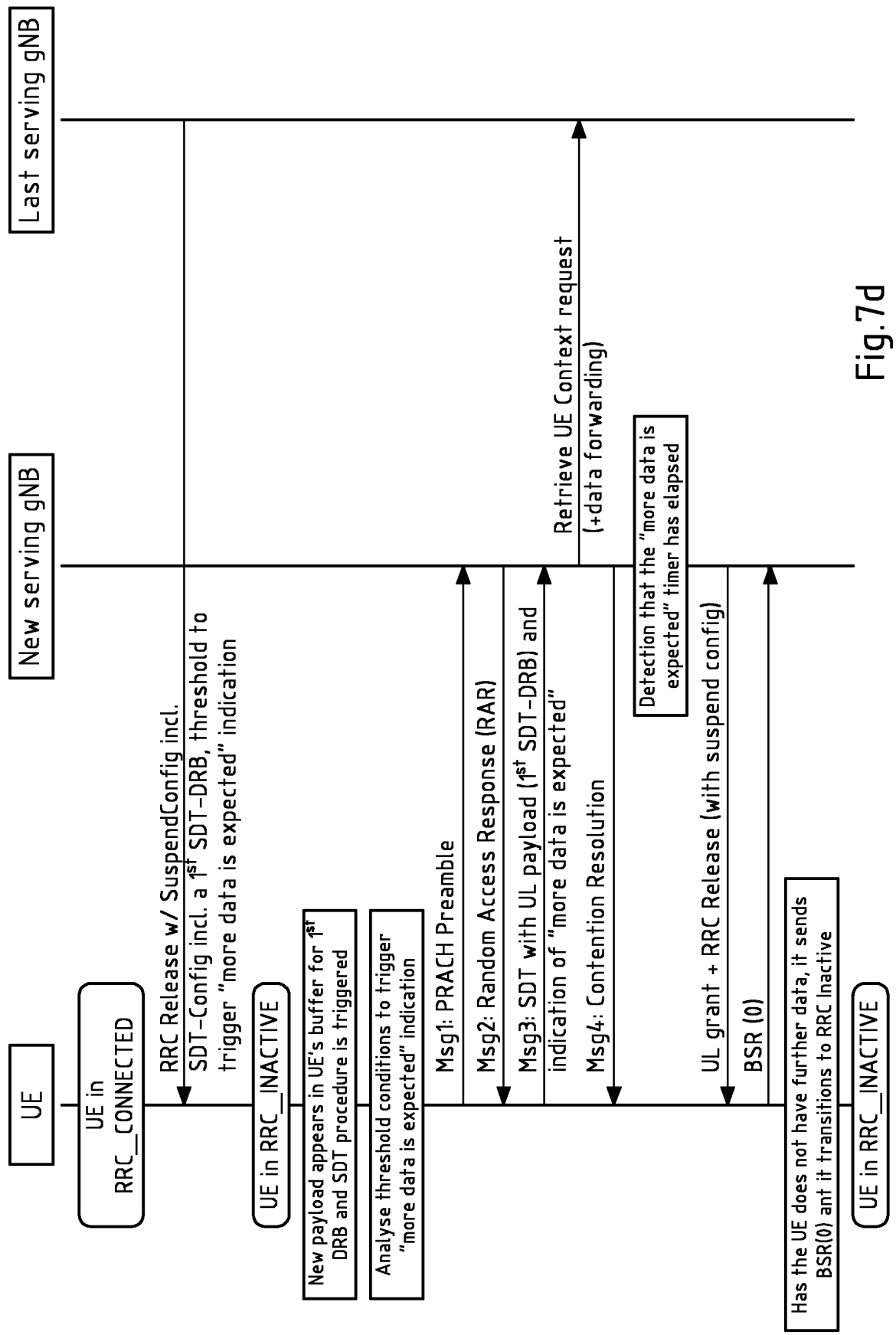

FIGS. 7c and 7d now pertain to the case, where the UE's buffer is empty. First, it can be referred to the examples of FIGS. 7a and 7b. However, in contrast to these examples, in FIG. 7c, no new payload arrives at the buffer of the UE. The UE will thus ignore the received UL grant and apply the received RRC release message (with suspendConfig) for transitioning to or remaining in the RRC inactive state. In the alternative embodiment of FIG. 7d, instead of not responding at all, the UE will send the BSR with buffer size index corresponding to 0 byte (BSR(0)) back to the network in response to the UL grant and then apply the RRC release message to transition to or remain in the RRC inactive state.

Figure 8:
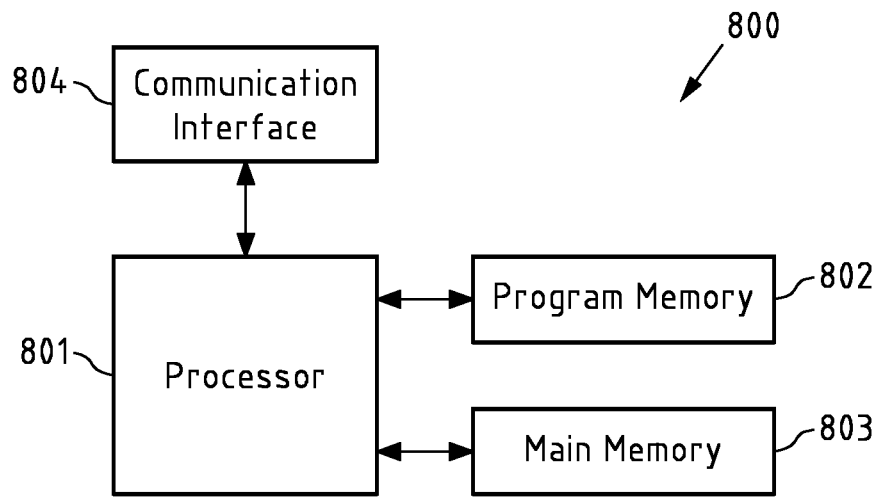
FIG. 8 is a block diagram of an exemplary embodiment of a UE according to the present disclosure.

Turning now to FIG. 8, there is shown a block diagram of an exemplary embodiment of a user equipment according to the present disclosure, such as UE 10 of FIG. 1 in the form of a user equipment 800. For example, user equipment 800 may be one of a smartphone, a tablet computer, a notebook computer, a smart watch, a smart band and an IoT device.

User equipment 800 comprises a processor 801. Processor 801 may represent a single processor or two or more processors, which are for instance at least partially coupled, for instance via a bus. Processor 801 executes a program code stored in program memory 802 (for instance program code causing user equipment 800 optionally together with network entity 900 to perform one or more of the embodiments of a method according to the present disclosure or parts thereof, when executed on processor 801), and interfaces with a main memory 803. Program memory 802 may also contain an operating system for processor 801. Some or all of memories 802 and 803 may also be included into processor 801.

One of or both of a main memory and a program memory of a processor (e.g. program memory 802 and main memory 803) could be fixedly connected to the processor (e.g. processor 801) or at least partially removable from the processor, for instance in the form of a memory card or stick.

A program memory (e.g. program memory 802) may for instance be a non-volatile memory. It may for instance be a FLASH memory (or a part thereof), any of a ROM, PROM, EPROM, MRAM or a FeRAM (or a part thereof) or a hard disc (or a part thereof), to name but a few examples. For example, a program memory may for instance comprise a first memory section that is fixedly installed, and a second memory section that is removable from, for instance in the form of a removable SD memory card.

A main memory (e.g. main memory 803) may for instance be a volatile memory. It may for instance be a DRAM memory, to give non-limiting example. It may for instance be used as a working memory for processor 801 when executing an operating system, an application, a program, and/or the like.

Processor 801 further controls a communication interface 804 (e.g. radio interface) configured to receive and/or transmit data and/or information. For instance, communication interface 804 may be configured to transmit and/or receive radio signals from a radio node, such as a base station. It is to be understood that any computer program code based processing required for receiving and/or evaluating radio signals may be stored in an own memory of communication interface 804 and executed by an own processor of communication interface 804 or it may be stored for example in memory 803 and executed for example by processor 801.

Communication interface 804 may in particular be configured to communicate according to a cellular communication system like a 2G/3G/4G/5G or future generation cellular communication system. User equipment 800 may use radio interface 804 to communicate with a base station, e.g. base station 20 depicted in FIG. 1.

For example, the communication interface 804 may further comprise a BLE and/or Bluetooth radio interface including a BLE transmitter, receiver or transceiver. For example, radio interface 804 may additionally or alternatively comprise a WLAN radio interface including at least a WLAN transmitter, receiver or transceiver.

The components 802 to 804 of user equipment 800 may for instance be connected with processor 801 by means of one or more serial and/or parallel busses.

It is to be understood that user equipment 800 may comprise various other components. For example, user equipment 800 may optionally comprise a user interface (e.g. a touch-sensitive display, a keyboard, a touchpad, a display, etc.).

Figure 9:
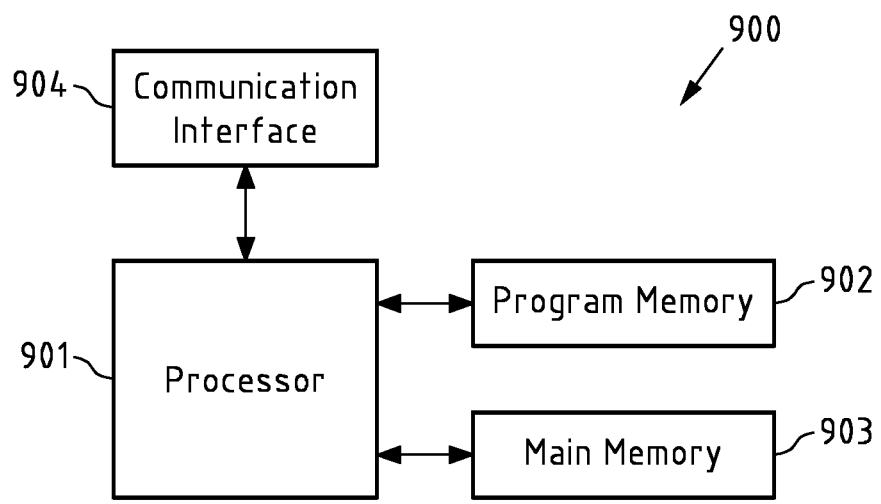
FIG. 9 is a block diagram of an exemplary embodiment of a base station.

FIG. 9 is a block diagram of an exemplary embodiment of a network entity, such as base station 20 and/or core network 30 (or a part thereof) of FIG. 1. For instance, network entity 900 may be configured for scheduling and/or transmitting positioning reference signals to user equipment, as described above.

Network entity 900 comprises a processor 901. Processor 901 may represent a single processor or two or more processors, which are for instance at least partially coupled, for instance via a bus. Processor 901 executes a program code stored in program memory 902 (for instance program code causing network entity 900 to perform alone or together with user equipment 800 embodiments according to the present disclosure or parts thereof), and interfaces with a main memory 903.

Program memory 902 may also comprise an operating system for processor 901. Some or all of memories 902 and 903 may also be included into processor 901.

Moreover, processor 901 controls a communication interface 904 which is for example configured to communicate according to a cellular communication system like a 2G/3G/4G/5G cellular communication system. Communication interface 904 of network entity 900 may be realized by radio heads 30 for instance and may be provided for communicate between base station 20 and UE 10 in FIG. 1.

The components 902 to 904 of network entity 900 may for instance be connected with processor 901 by means of one or more serial and/or parallel busses.

User equipment 800 together with communication interface 804 may in particular be configured for receiving signals from a network entity 900 according to the approach scheme describe herein.

It is to be understood that apparatuses 800, 900 may comprise various other components.

Figure 10:
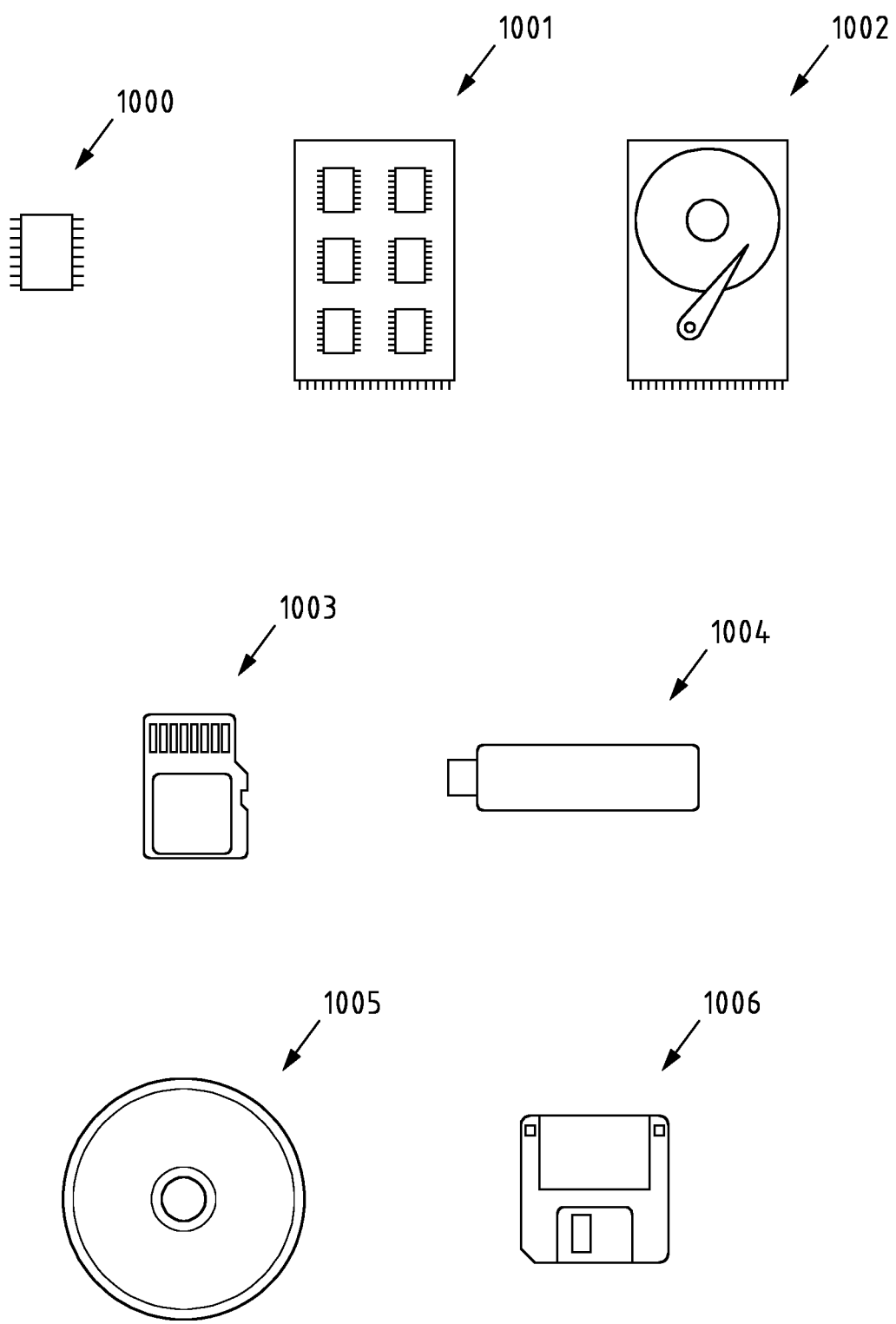
FIG. 10 is a schematic illustration of examples of tangible and non-transitory computer-readable storage media.

FIG. 10 is a schematic illustration of examples of tangible and non-transitory computer-readable storage media according to the present disclosure that may for instance be used to implement memory 802 of FIG. 8 or memory 902 of FIG. 9. To this end, FIG. 10 displays a flash memory 1000, which may for instance be soldered or bonded to a printed circuit board, a solid-state drive 1001 comprising a plurality of memory chips (e.g. Flash memory chips), a magnetic hard drive 1002, a Secure Digital (SD) card 1003, a Universal Serial Bus (USB) memory stick 1004, an optical storage medium 1005 (such as for instance a CD-ROM or DVD) and a magnetic storage medium 1006.

The following embodiments are also disclosed:

1. A user equipment comprising means configured to:
   transmit, to the network, first data in a small data transmission procedure in a non-connected state; and
   during said small data transmission procedure in the non-connected state, transmit, to the network, an indication for transmission of second data, the second data becoming available for transmission after said first data having been transmitted.

2. The user equipment of embodiment 1, wherein one or more of:
   the indication for transmission of second data is transmitted before receiving, from the network, a release message;
   the indication for transmission of second data is transmitted after transmitting the first data;
   the indication for transmission of second data is transmitted after receiving a first contention resolution message received; and/or
   the indication for transmission of second data is transmitted as part of a message comprising the first data.

3. The user equipment of embodiment for 2, wherein the indication for transmission of second data is or comprises one or more of:
   a scheduling request;
   a buffer status report; and/or
   an indication that more data is expected.

4. The user equipment of any of embodiments 1 to 3, further configured to one or more of:
   receive, from the network, a release message for entering the non-connected state;
   enter the non-connected state by applying the release message received from the network;
   transmit, to the network, a first random access preamble;
   transmit, to the network, the first data with the first random access preamble;
   receive, from the network, a first random access response in response to the first random access preamble;
   transmit, to the network, the first data in the non-connected state in response to the first random access response; and/or
   receive, from the network, a contention resolution message in response to the transmission of the first data.

5. The user equipment of any of embodiments 1 to 4, further configured to at least one of:
   receive, from the network, a resource configuration pertaining to the transmission of the indication of the second data and/or to the transmission of the second data; and/or
   receive, from the network, threshold information whether to transmit the indication for transmission of second data.

6. The user equipment of embodiment 5, the resource configuration is or comprises one or more of:
   a resource configuration for transmitting a scheduling request;
   a resource configuration tor transmitting a buffer status report;
   a resource configuration for a configured grant;
   a resource configuration for a random access preamble;
   an uplink grant; and/or
   a resource configuration including one or more PUCCH and/or one or more PUSCH resources.

7. The user equipment of any of embodiment 5 or 6, further configured to one or more of:
   receive the threshold information as part of a release message;
   receive the resource configuration as part of a or the release message;
   receive the resource configuration as part of a contention resolution message (Msg4) in response to the transmission of the first data;
   receive the resource configuration as a broadcast message; and/or
   receive the resource configuration as part of a release message after the transmission of the indication.

8. The user equipment of any of embodiments 5 to 7, further configured to one or more of:
   activate the resource configuration after receiving a first contention resolution message in response to transmitting the first data;
   transmit, to the network, the second data in the small data transmission procedure in the non-connected state based on the resource configuration; and/or
   transmit, to the network, the indication for transmission of second data based on the resource configuration.

9. The user equipment of any of embodiments 1 to 8, further configured to:
   check whether second data is available at the user equipment;
   in case second data is available at the user equipment, transmit, to the network, the indication for transmission of second data and/or transmit the second data in the non-connected state.

10. The user equipment of any of embodiments 1 to 9, further configured to one or more of:
    transmit, to the network, the second data in the small data transmission procedure in the non-connected state; and/or
    receive, from the network, a release message.

11. The user equipment of any of embodiments 1 to 10, further configured to one or more of:
    transmit, to the network, a second random access preamble;
    transmit, to the network, the second data with or after a or the second random access preamble;
    receive, from the network, a second random access response in response to a or the second random access preamble;
    transmit, to the network, the second data in the non-connected state in response to a or the second random access response; and/or receive, from the network, a second contention resolution message.

12. The user equipment of any of embodiments 1 to 11, wherein one or more of:
    the non-connected state is an RRC inactive state;
    the first and/or second data is control plane data;
    the first and/or second data is a RAN notification area update;
    the first and/or second data is user plane data;
    the first and/or second data is transmitted in a two-step or four-step RACH procedure
    the first and/or second data is transmitted with a CG-based PUSCH transmission; and/or
    the network comprises a last serving base station and/or a new serving base station.

13. A method, at least performed by a user equipment, the method comprising:
    transmitting, to the network, first data in a small data transmission procedure in a non-connected state; and
    during the small data transmission procedure, transmitting, to the network, an indication for transmission of second data, the second data becoming available for transmission after said first data having been transmitted.

14. A network entity comprising means configured to:
    receive, from a user equipment in a non-connected state, first data in a small data transmission procedure;
    transmit, to the user equipment, a resource configuration pertaining to a transmission of an indication of second data and/or to a transmission of the second data to occur during the small data transmission procedure; and
    during the small data transmission procedure, receive, from the user equipment in the non-connected state, the indication for transmission of second data.

15. The network entity of embodiment 14, further configured to one or more of:
    transmit, to the user equipment, a first release message for entering the non-connected state;
    receive, from the user equipment, a first random access preamble;
    transmit, to the user equipment, a first random access response in response to the first random access preamble;
    receive, from the user equipment, the first data in response to the first random access response; and/or
    transmit, to the user equipment, a contention resolution message in response to the transmission of the first data.

16. The network entity of embodiment 14 or 15, further configured:
    transmit, to the user equipment, threshold information whether to transmit the indication for transmission of second data.

17. The network entity of embodiment 16, further configured to one or more of:
    transmit the threshold information as part of a release message;
    transmit the resource configuration as part of a or the release message;
    transmit the resource configuration as part of a contention resolution message in response to the transmission of the first data;
    transmit the resource configuration as a broadcast message; and/or
    transmit the resource configuration as part of a release message after the reception of the indication.

18. The network entity of embodiment 16 or 17, further configured to:
    monitor resources indicated by the transmitted resource configuration pertaining to the transmission of the indication of the second data and/or to the transmission of the second data.

19. The network entity of any of embodiments 14 to 18, further configured to one or more of:
    receive, from the user equipment in the non-connected state, the second data in the small data transmission procedure;
    transmit, to the user equipment, a release message.

20. The network entity of any of embodiments 14 to 19, further configured to one or more of:
    receive, from the user equipment, a second random access preamble;
    receive, from the user equipment, the second data with the second random access preamble;
    transmit, to the user equipment, a second random access response in response to the first random access preamble;
    receive, from the user equipment in the non-connected state, the second data in response to the second random access response; and/or
    transmit, to the user equipment, a second contention resolution message.

21. The network entity of any of embodiments 14 to 20, further configured to:
    transmit, to a last serving base station, a user equipment context request; and
    receive, from a last serving base station, a user equipment context response.

22. A method, at least performed by at a network entity, the method comprising:
    receiving, from a user equipment in a non-connected state, first data in a small data transmission procedure;
    transmitting, to the user equipment, a resource configuration pertaining to a transmission of an indication of second data and/or to a transmission of the second data to occur during the small data transmission procedure; and
    during the small data transmission procedure, receiving, from the user equipment in the non-connected state, the indication for transmission of second data.

23. Computer program code, the computer program code when executed by a processor of an apparatus causing the apparatus to perform a method according to any of embodiments 13 or 22.

24. Computer readable storage medium comprising computer program code according to embodiment 23.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to sections of processor(s)/software (including digital signal processor(s)), software, and memory(ies) that work together to cause an apparatus, such as a mobile phone, to perform various functions) and (c) to circuits, such as a microprocessor(s) or a section of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 801 and 901 of FIGS. 8 and 9, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions or steps described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The wording "A, or B, or C, or a combination thereof" or "at least one of A, B and C" may be understood to be not exhaustive and to include at least the following: (i) A, or (ii) B, or (iii) C, or (iv) A and B, or (v) A and C, or (vi) B and C, or (vii) A and B and C.

It will be understood that the embodiments disclosed herein are only exemplary, and that any feature presented for a particular exemplary embodiment may be used with any aspect of the present disclosure on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

LIST OF ABBREVIATIONS

AMF Access and Mobility Management Function
BSR Buffer Status Report
CG Configured Grant
CP Control Plane
DRB Data Radio Bearer
gNB 5G Node B
I-RNTI Inactive Radio network temporary identifier
LCG Logical Channel Group
LCH Logical Channel
NCC nextHopChainingCount
NG-RAN Next Generation-Radio Access Network
NR New Radio
PRACH Physical Random access channel
RACH Random access channel
RAN Radio Access Network
RNA RAN Notification area
RNAU RAN Notification area Update
RRC Radio Resource Control protocol
SDT Small Data Transmission
UE User Equipment
UP user plane
Xn Xn network interface

The invention claimed is:

1. A user equipment comprising:
at least one processor; and
at least one memory including computer program code, the at least one memory and the computer program code configured to, with the at least one processor, cause the user equipment to:
transmit, to the network entity, first data in a small data transmission procedure in a non-connected state; and
transmit, to the network entity, an indication related to a transmission of second data after the transmission of the first data, the second data becoming available after the first data having been transmitted while the small data transmission procedure is ongoing, the second data being a new data, and the second data being to be transmitted when the user equipment is in a radio resource control (RRC) connected state,
wherein the indication for transmission of second data is transmitted before receiving, from the network entity, a RRC resume message; and/or
the indication for transmission of second data is transmitted after transmitting the first data.

2. The user equipment of claim 1, wherein the user equipment is further caused to:
receive, from the network entity, an RRC resume message indicating to transit the user equipment to the RRC connected state.

3. The user equipment of claim 1, wherein the indication for transmission of second data is or comprises one or more of:
a scheduling request;
a buffer status report; and/or
an indication that more data is expected.

4. The user equipment of claim 1, wherein the at least one memory and the computer program code are further configured to, with the at least one processor, further cause the user equipment to one or more of:
receive, from the network entity, a resource configuration pertaining to the transmission of the indication of the second data and/or to the transmission of the second data; and/or
receive, from the network entity, threshold information whether to transmit the indication for transmission of second data.

5. The user equipment of claim 4, the resource configuration is or comprises one or more of:
a resource configuration for transmitting a scheduling request;
a resource configuration tor transmitting a buffer status report;

a resource configuration for a configured grant;
a resource configuration for a random access preamble;
an uplink grant; and/or
a resource configuration including one or more PUCCH and/or one or more PUSCH resources.

6. The user equipment of claim 4, wherein the at least one memory and the computer program code are further configured to, with the at least one processor, further cause the user equipment to one or more of:
receive the threshold information as part of a release message;
receive the resource configuration as part of a or the release message;
receive the resource configuration as part of a contention resolution message in response to the transmission of the first data;
receive the resource configuration as a broadcast message; and/or
receive the resource configuration as part of a release message after the transmission of the indication.

7. The user equipment of claim 1, wherein the user equipment is further caused to:
transition to the RRC connected state for transmitting the second data; and
transmit, to the network entity, the second data in the RRC connected mode.

8. A method performed by a user equipment, the method comprising:
transmitting, to a network entity, first data in a small data transmission procedure in a non-connected state; and
transmitting, to the network entity, an indication related to a transmission of second data after the transmission of the first data,
the second data becoming available after the first data having been transmitted while the small data transmission procedure is ongoing, the second data is a new data, and the second data is to be transmitted when the user equipment is in a radio resource control (RRC) connected state, and
wherein the indication for transmission of second data is transmitted before receiving, from the network entity, a RRC resume message; and/or
the indication for transmission of second data is transmitted after transmitting the first data.

9. The method of claim 8, wherein the indication for transmission of second data is or comprises one or more of:
a scheduling request;
a buffer status report; and/or
an indication that more data is expected.

10. The method of claim 8, further comprising:
receiving, from the network entity, a resource configuration pertaining to the transmission of the indication of the second data and/or to the transmission of the second data; and
receiving, from the network entity, threshold information whether to transmit the indication for transmission of second data.

11. The method of claim 10, the resource configuration is or comprises one or more of:
a resource configuration for transmitting a scheduling request;
a resource configuration tor transmitting a buffer status report;
a resource configuration for a configured grant;
a resource configuration for a random access preamble;
an uplink grant; and/or
a resource configuration including one or more PUCCH and/or one or more PUSCH resources.

12. The method of claim 10, further comprising:
receive the threshold information as part of a release message;
receive the resource configuration as part of a or the release message;
receive the resource configuration as part of a contention resolution message in response to the transmission of the first data;
receive the resource configuration as a broadcast message; and/or
receive the resource configuration as part of a release message after the transmission of the indication.

13. The method of claim 8, further comprising:
receiving, from the network entity, an RRC resume message indicating to transit the user equipment to the RRC connected state.

14. The method of claim 8, further comprising:
transitioning to the RRC connected state for transmitting the second data; and
transmitting, to the network entity, the second data in the RRC connected mode.

15. A non-transitory computer readable medium comprising program instructions which, when executed by an user equipment, cause the user equipment to perform at least the following:
transmitting, to a network entity, first data in a small data transmission procedure in a non-connected state; and
transmitting, to the network entity, an indication related to a transmission of second data after the transmission of the first data,
the second data becoming available after the first data having been transmitted while the small data transmission procedure is ongoing, the second data is a new data, and the second data is to be transmitted when the user equipment is in a radio resource control (RRC) connected state,
wherein the indication for transmission of second data is transmitted before receiving, from the network entity, a RRC resume message; and/or
the indication for transmission of second data is transmitted after transmitting the first data.

16. The non-transitory computer readable medium of claim 15, wherein the program instructions further cause the user equipment to perform:
receiving, from the network entity, an RRC resume message indicating to transit the user equipment to the RRC connected state.

17. The non-transitory computer readable medium of claim 15, wherein the program instructions further cause the user equipment to perform:
transitioning to the RRC connected state for transmitting the second data; and
transmitting, to the network entity, the second data in the RRC connected mode.

* * * * *